(12) United States Patent
Adlem et al.

(10) Patent No.: US 11,118,112 B2
(45) Date of Patent: Sep. 14, 2021

(54) POLYMERISABLE LIQUID CRYSTAL MATERIAL AND POLYMERISED LIQUID CRYSTAL FILM

(71) Applicant: Merck Patent GmbH, Darmstadt (DE)

(72) Inventors: Kevin Adlem, Bournemouth (GB); Iain Gardiner, Southampton (GB); Jack Bradford, Southampton (GB); Stephen Mulcahy, Southampton (GB); James Allen, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 76 days.

(21) Appl. No.: 15/740,870

(22) PCT Filed: Jun. 6, 2016

(86) PCT No.: PCT/EP2016/000933
§ 371 (c)(1),
(2) Date: Dec. 29, 2017

(87) PCT Pub. No.: WO2017/001039
PCT Pub. Date: Jan. 5, 2017

(65) Prior Publication Data
US 2018/0195004 A1 Jul. 12, 2018

(30) Foreign Application Priority Data

Jun. 30, 2015 (EP) .................................. 15001945

(51) Int. Cl.
*C09K 19/54* (2006.01)
*C09K 19/52* (2006.01)
*C09K 19/38* (2006.01)
*C09K 19/04* (2006.01)

(52) U.S. Cl.
CPC .......... *C09K 19/54* (2013.01); *C09K 19/3838* (2013.01); *C09K 19/52* (2013.01); *C09K 2019/0448* (2013.01); *C09K 2219/03* (2013.01)

(58) Field of Classification Search
CPC ............................... C09K 19/52; C09K 19/54
See application file for complete search history.

(56) References Cited

U.S. PATENT DOCUMENTS

| | | | |
|---|---|---|---|
| 4,118,540 A * | 10/1978 | Amort ................. | C04B 41/4922 427/374.1 |
| 4,842,766 A | 6/1989 | Blehm et al. | |
| 5,667,920 A | 9/1997 | Chiulli et al. | |
| 7,410,677 B2 | 8/2008 | Hirai | |
| 8,029,695 B2 | 10/2011 | Lee et al. | |
| 8,574,673 B2 | 11/2013 | Rueckes et al. | |
| 9,080,057 B2 | 7/2015 | Backer et al. | |
| 9,151,436 B2 | 10/2015 | Brill et al. | |
| 9,309,448 B2 | 4/2016 | Kujat et al. | |
| 9,440,997 B2 | 9/2016 | Backer et al. | |
| 9,920,249 B2 | 3/2018 | Lee et al. | |
| 10,100,253 B2 | 10/2018 | Gardiner et al. | |
| 2005/0224754 A1 | 10/2005 | Hirai | |
| 2009/0227803 A1* | 9/2009 | Kemperman ........... | A61P 25/00 548/421 |
| 2010/0215959 A1 | 8/2010 | Jonschker et al. | |
| 2011/0037026 A1* | 2/2011 | Lee ........................ | C09K 19/54 252/299.63 |
| 2011/0086234 A1 | 4/2011 | Stasko et al. | |
| 2012/0021142 A1 | 1/2012 | Lee et al. | |
| 2012/0241664 A1* | 9/2012 | Brill ......................... | G02B 1/04 252/62 |
| 2012/0311935 A1 | 12/2012 | Kujat et al. | |
| 2014/0106089 A1* | 4/2014 | Lee ...................... | C09K 19/2007 428/1.23 |
| 2014/0134321 A1 | 5/2014 | Stasko et al. | |
| 2014/0350152 A1 | 11/2014 | Backeer | |
| 2014/0350277 A1 | 11/2014 | Backer et al. | |
| 2016/0213820 A1 | 7/2016 | Minagawa et al. | |
| 2016/0215216 A1 | 7/2016 | Yoon | |

FOREIGN PATENT DOCUMENTS

| | | |
|---|---|---|
| CN | 101196688 A | 6/2008 |
| CN | 101874097 A | 10/2010 |
| CN | 102459457 A | 5/2012 |
| CN | 102656252 A | 9/2012 |
| CN | 102762684 A | 10/2012 |
| CN | 102782056 A | 11/2012 |
| CN | 103635561 A | 3/2014 |
| CN | 103974960 A | 8/2014 |
| CN | 103975026 A | 8/2014 |
| CN | 104411800 A | 3/2015 |
| DE | 206848 A1 | 2/1984 |
| JP | 63232837 A2 | 9/1988 |
| JP | 5284240 A | 10/1993 |
| JP | 2000506996 A | 6/2000 |

(Continued)

OTHER PUBLICATIONS

English translation of JP2006291096. (Year: 2006).*
English translation of JP2005249897. (Year: 2005).*
International Search Report PCT/EP2016/000933 dated Sep. 29, 2016.
Office Actions dated Dec. 19, 2019 of the corresponding Taiwanese Patent Application 105120652. (pp. 1-3).
Office Action dated Apr. 9, 2020 in the corresponding Japanese Patent Application (JP 2017-568092) (pp. 1-5).
Office Action in corresponding CN 201680038191.8 dated Nov. 20, 2020 (pp. 4-12).
Office Action in corresponding CN application 201680038191.8 dated Jul. 2, 2021 (pp. 1-6).

*Primary Examiner* — Chanceity N Robinson
*Assistant Examiner* — Anna Malloy
(74) *Attorney, Agent, or Firm* — Millen, White, Zelano & Branigan, P.C.; Brion P. Heaney

(57) ABSTRACT

Compounds of formula I,

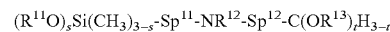

$(R^{11}O)_s Si(CH_3)_{3-s}\text{-}Sp^{11}\text{-}NR^{12}\text{-}Sp^{12}\text{-}C(OR^{13})_t H_{3-t}$  I wherein the variable groups are as defined herein are useful as adhesion promotors in polymerizable liquid crystal (LC) material.

22 Claims, No Drawings

(56) References Cited

FOREIGN PATENT DOCUMENTS

| | | | | |
|---|---|---|---|---|
| JP | 2005249897 | A | * | 9/2005 |
| JP | 2006126757 | A | | 5/2006 |
| JP | 2006291096 | A | | 10/2006 |
| JP | 2006291096 | A | * | 10/2006 |
| JP | 2008129463 | A | | 6/2008 |
| JP | 2009013228 | A | | 1/2009 |
| JP | 2009517349 | A | | 4/2009 |
| JP | 2012523581 | T2 | | 10/2012 |
| JP | 2013520547 | A | | 6/2013 |
| JP | 2015107312 | A | | 6/2015 |
| WO | 2009066947 | A2 | | 5/2009 |
| WO | 11014446 | A1 | | 2/2011 |
| WO | 2013083742 | A1 | | 6/2013 |
| WO | 2013083748 | A1 | | 6/2013 |
| WO | WO-2013083742 | A1 | * | 6/2013 ............. C08K 5/548 |
| WO | 2015036072 | A1 | | 3/2015 |

* cited by examiner

POLYMERISABLE LIQUID CRYSTAL MATERIAL AND POLYMERISED LIQUID CRYSTAL FILM

FIELD OF INVENTION

The invention relates to compounds of formula I,

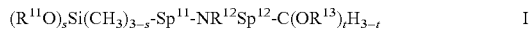

wherein the parameter are defined in claim 1, a method for their preparation, to the use of compounds of formula I as adhesion promotors in polymerisable liquid crystal (LC) material, to a polymer film comprising a polymerised material with improved adhesion to a substrate, to methods for preparing such a polymer film, to a corresponding polymerisable LC material used for the preparation of such a polymer film, and to the use of the polymer film and said polymerisable LC material for optical, electrooptical, decorative or security uses and devices.

BACKGROUND AND PRIOR ART

Polymerisable liquid crystal (LC) materials are commonly used for the preparation of optical films in liquid crystal displays. These materials usually contain a certain amount of compounds with two or more polymerisable groups (di- or multi-functional), which are crosslinked to give a hard film.

However, during polymerisation certain polymerisable materials, like for example acrylates, suffer polymer shrinkage [see R. A. M. Hikmet, B. H. Zwerver and D. J. Broer Polymer (1992), 33, 89]. This shrinkage causes a lot of strain in the polymerised film and reduces the adhesion between the film and the substrate.

One technique reported in prior art to overcome this problem concentrates on modifying the substrate to improve its adhesion to the polymerised film. For example, the substrate can be subjected to special treatment, for example flame treatment as disclosed in U.S. Pat. No. 2,795,820 or GB 0 788 365, corona treatment as reported in DE 1 128 644, or plasma treatment as reported in R. L. Bersin Adhesives Age (1972) 15, 37.

Alternatively, a separate adhesion or coupling layer (typically a solution of organo-silane materials) can be coated onto the substrate to help increase adhesion of a polymer film to a substrate, like e.g. the commercially available Addid 900 ® (from Wacker GmbH, Burghausen, Germany), an amino-functional trimethoxy silane.

U.S. Pat. No. 5,631,051 discloses a method of preparing an optical compensation sheet on a transparent substrate of triacetyl cellulose (TAC), by first providing an adhesion layer of gelatine on the TAC film. Then an aligning layer is formed by coating a solution of denaturated polyvinyl alcohol (PVA), which was chemically modified by addition of polymerisable groups, onto the gelatine layer, evaporating the solvent and rubbing the surface of the polymerised PVA layer unidirectionally, Finally an optically anisotropic layer comprising discotic LC material is coated onto the rubbed surface of the PVA layer and polymerised.

U.S. Pat. No. 5,747,121 discloses a method of preparing an optical compensation sheet by coating a solution of denaturated polyvinyl alcohol (PVA), which was chemically modified by addition of polymerisable groups, onto a transparent substrate, evaporating the solvent and rubbing the surface of the PVA layer unidirectionally. Then an optically anisotropic layer comprising discotic LC material is coated onto the rubbed surface of the PVA layer and polymerised. Afterwards the film is subjected to heat treatment whereby the PVA layer and the discotic LC layer are reported to be chemically bonded to each other via free, crosslinkable groups.

However, the use of separate adhesion or aligning layers comprising isotropic materials like gelatine or PVA can negatively influence the performance of the liquid crystal film when used e.g. as an optical film.

To overcome this problem an adhesion promoter can be directly added to the polymerisable LC material formulation. For example, WO 2006/062352 A1 discloses a homeotropic aligned polymer film without using a separate adhesion or aligning layer. The polymer film is obtained by coating a polymerisable LC mixture solution including a predetermined surfactant on a plastic substrate whose surface is hydrophilic-treated, drying, and UV irradiating the mixture solution.

WO2009/66947 A1 discloses a polymerisable liquid crystal composition that includes a polymerisable reactive homeotropic alignment liquid crystal mixture solution and a primary or secondary amino compound.

JP 4742217 B is directed to a polymerisable liquid crystal composition, an orientation-controlled liquid crystal layer made from that composition, which comprises polymerisable liquid crystal compounds and a specific alkyl amine or alkoxy silyl alkyl amine and mixed solvents selected from specific two groups.

JP 4595498 B discloses a polymerisable liquid-crystal composition for obtaining a liquid-crystal film comprising a polymerisable liquid-crystal compound and an organosilicon compound, having a primary amino group.

However, all of the above-described methods have the distinct disadvantage that they involve extra processing steps, like a surface treatment step or exhibit an unfavourable yellow colouration of the resulting film over time.

Therefore, there is still the need for an alternative polymerisable liquid crystal (LC) material for the preparation of a homeotropic aligned polymer film, which does not exhibit the drawbacks of prior art materials or if so, do only exhibit them to a less extent.

Advantageously, the polymerisable LC material for the preparation of a homeotropic aligned polymer film, should
 show favourable adhesion to a plastic substrate, such as TAC, COP, or colour filters etc.
 do not require the use of separate adhesion layer,
 do not require the use of a separate alignment layer,
 exhibit an uniform homeotropically alignment,
 be highly transparent to VIS-light,
 exhibit an reduced yellow colouration over time and
 show a favourable high temperature stability, especially in view of in-cell applications.

Other aims of the present invention are immediately evident to the person skilled in the art from the following detailed description.

Surprisingly, the inventors of the present invention have found that the above aims can be achieved and the mentioned drawbacks of prior art polymerisable LC materials can be overcome by using a polymerisable LC material comprising a low amount of an adhesion promoter. The adhesion promoter should improve adhesion of the polymerised LC film to the substrate, and at the same time should not, or only to a minor extent, negatively affect the liquid crystal phase of the material, such as the uniform orientation, or the optical properties of the film, such as the transmission.

SUMMARY OF THE INVENTION

The invention relates to compounds of formula I,

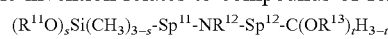

wherein
$R^{11}$ each and independently from another in each occurrence denote a methyl, or ethyl radical; more preferably in each occurrence a methyl radical.

$R^{12}$ denotes H or straight-chain or branched alkylene having 1 to 12 C atoms, preferably 1 to 9 C atoms, in which one or more non-adjacent $CH_2$ groups may each be replaced, independently of one another by —CH=CH—, —C≡C—, —O—, —S—, —CO—, —CO—O—, —O—CO—, —O—CO—O— in such a way that O and/or S atoms are not linked directly to one another, and in which, in addition, one or more H atoms may be replaced by F, Cl or CN; more preferably H or methyl, $R^{13}$ each and independently from another in each occurrence denotes a methyl, or ethyl radical and if t denotes 2, two $R^{13}$ can form a cyclic acetal having a bridging 1,2-ethanediyl or 1,3-propanediyl; more preferably in each occurrence a methyl radical, $Sp^{11}$ denotes a single bond or straight-chain or branched alkylene having 1 to 12 C atoms, preferably 1 to 9 C atoms, in which one or more non-adjacent $CH_2$ groups may each be replaced, independently of one another, by —CH=CH—, —C≡C—, —O—, —S—, —CO—, —CO—O—, —O—CO—, —O—CO—O— in such a way that O and/or S atoms are not linked directly to one another, and in which, in addition, one or more H atoms may be replaced by F, Cl or CN; more preferably ethylene, straight-chain or branched propylene or straight chain or branched butylene, $Sp^{12}$ denotes a single bond or straight-chain or branched alkylene having 1 to 12 C atoms, preferably 1 to 9 C atoms, in which one or more non-adjacent $CH_2$ groups may each be replaced, independently of one another, by —CH=CH—, —C≡C—, —O—, —S—, —CO—, —CO—O—, —O—CO—, —O—CO—O— in such a way that O and/or S atoms are not linked directly to one another, and in which, in addition, one or more H atoms may be replaced by F, Cl or CN; more preferably methylene or ethylene, s denotes integer from 0 to 3; preferably 1, 2 or 3; more preferably 2 or 3; in particular 3; and t denotes an integer from 0 to 3; preferably 1, 2, or 3; more preferably 1 or 2; in particular 1, and to a method of production of a compound of formula I.

The invention further relates to a polymerisable liquid crystal (LC) material, which comprises one or more polymerisable mesogenic compounds and at least one compound of formula I, to a polymer film obtainable, preferably obtained from the polymerisable LC material, as described above and below and to a method of production of a polymer film, as described above and below.

The invention further relates to a method of increasing the adhesion of a polymer film, obtainable preferably obtained, from a polymerisable LC material, to a substrate, preferably a plastic substrate, film or surface, by adding one or more adhesion promoters to the LC material before polymerisation.

The invention further relates to the use of a polymer film or polymerisable LC material, as described above and below, in optical, electrooptical, information storage, decorative and security applications, like liquid crystal displays, projection systems, polarisers, compensators, alignment layers, circular polarisers, colour filters, decorative images, liquid crystal pigments, reflective films with spatially varying reflection colours, multicolour images, non-forgeable documents like identity or credit cards or banknotes.

The invention further relates to a optical component or device, polariser, patterned retarder, compensator, alignment layer, circular polariser, colour filter, decorative image, liquid crystal lens, liquid crystal pigment, reflective film with spatially varying reflection colours, multicolour image for decorative or information storage, comprising at least one a polymer film or polymerisable LC material, as described above and below The invention further relates to a liquid crystal display comprising at least one polymer film or polymerisable LC material or an optical component, as described above and below.

The invention further relates to authentification, verification or security marking, coloured or multicolour image for security use, non-forgeable object or document of value like an identity or credit card or a banknote, comprising at least one polymer film or polymerisable LC material or a optical component as described above and below.

TERMS AND DEFINITIONS

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerisation purification processes, are typically mixed or co-mingled with the polymer such that they generally remain with the polymer when it is transferred between vessels or between solvents or dispersion media.

The term "(meth)acrylic polymer" as used in the present invention includes a polymer obtained from acrylic monomers, a polymer obtainable from methacrylic monomers, and a corresponding co-polymer obtainable from mixtures of such monomers.

The term "polymerisation" means the chemical process to form a polymer by bonding together multiple polymerisable groups or polymer precursors (polymerisable compounds) containing such polymerisable groups.

The terms "film" and "layer" include rigid or flexible, self-supporting or freestanding films with mechanical stability, as well as coatings or layers on a supporting substrate or between two substrates.

The term "liquid crystal (LC)" relates to materials having liquid-crystalline mesophases in some temperature ranges (thermotropic LCs) or in some concentration ranges in solutions (lyotropic LCs). They obligatorily contain mesogenic compounds.

The terms "mesogenic compound" and "liquid crystal compound" mean a compound comprising one or more calamitic (rod- or board/lath-shaped) or discotic (disk-shaped) mesogenic groups. The term "mesogenic group" means a group with the ability to induce liquid-crystalline phase (or mesophase) behaviour.

The compounds comprising mesogenic groups do not necessarily have to exhibit a liquid-crystalline mesophase themselves. It is also possible that they show liquid-crystalline mesophases only in mixtures with other compounds, or when the mesogenic compounds or materials, or the mixtures thereof, are polymerised. This includes low-molecular-weight non-reactive liquid-crystalline compounds, reactive or polymerisable liquid-crystalline compounds, and liquid-crystalline polymers.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

The term "reactive mesogen" means a polymerisable mesogenic or liquid crystal compound, preferably a monomeric compound. These compounds can be used as pure compounds or as mixtures of reactive mesogens with other compounds functioning as photoinitiators, inhibitors, surfactants, stabilizers, chain transfer agents, non-polymerisable compounds, etc.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive or non-polymerisable" compounds.

The term "non-mesogenic compound or material" means a compound or material that does not contain a mesogenic group as defined above.

The term "adhesion promoter" in the sense of the present invention means a compound or material that is used in a polymerisable LC material, e.g. for preparation of an LC polymer film, and significantly improves adhesion of the polymerised LC material or the LC polymer film to a substrate.

Visible light is electromagnetic radiation that has wavelength in a range from about 400 nm to about 740 nm. Ultraviolet (UV) light is electromagnetic radiation with a wavelength in a range from about 200 nm to about 450 nm.

The Irradiance ($E_e$) or radiation power is defined as the power of electromagnetic radiation ($d\theta$) per unit area ($dA$) incident on a surface:

$$E_e = d\theta/dA. \tag{2}$$

The radiant exposure or radiation dose ($H_e$), is as the irradiance or radiation power ($E_e$) per time (t):

$$H_e = E_e \cdot t. \tag{3}$$

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

The term "clearing point" means the temperature at which the transition between the mesophase with the highest temperature range and the isotropic phase occurs.

The term "director" is known in prior art and means the preferred orientation direction of the long molecular axes (in case of calamitic compounds) or short molecular axes (in case of discotic compounds) of the liquid-crystalline or RM molecules. In case of uniaxial ordering of such anisotropic molecules, the director is the axis of anisotropy.

The term "alignment" or "orientation" relates to alignment (orientational ordering) of anisotropic units of material such as small molecules or fragments of big molecules in a common direction named "alignment direction". In an aligned layer of liquid-crystalline or RM material the liquid-crystalline director coincides with the alignment direction so that the alignment direction corresponds to the direction of the anisotropy axis of the material.

The terms "uniform orientation" or "uniform alignment" of an liquid-crystalline or RM material, for example in a layer of the material, mean that the long molecular axes (in case of calamitic compounds) or the short molecular axes (in case of discotic compounds) of the liquid-crystalline or RM molecules are oriented substantially in the same direction. In other words, the lines of liquid-crystalline director are parallel.

The term "homeotropic structure" or "homeotropic orientation" refers to a film wherein the optical axis is substantially perpendicular to the film plane.

The birefringence $\Delta n$ is defined as follows $$\Delta n = n_e - n_o \tag{4}$$

wherein $n_e$ is the extraordinary refractive index and $n_o$ is the ordinary refractive index, and the average refractive index $n_{av.}$ is given by the following equation:

$$n_{av.} = ((2n_o^2 + n_e^2)/3)^{1/2} \tag{5}$$

The average refractive index $n_{av.}$ and the ordinary refractive index $n_o$ can be measured using an Abbe refractometer. $\Delta n$ can then be calculated from the above equations.

In case of doubt the definitions as given in C. Tschierske, G. Pelzl and S. Diele, Angew. Chem. 2004, 116, 6340-6368 shall apply.

DETAILED DESCRIPTION

Typically, the compound of formula I is dispersed in the polymerisable LC material. In good agreement with the theory it is believed, that the side chain of the (meth)acrylic polymer, which comprises one or more primary amino groups, is capable to chemically interact with the surface of the substrate via a non-covalent interaction.

In a preferred embodiment, the compounds of formula I are selected from the group of compounds of formula I-A to I-C,

| | |
|---|---|
| $(R^{11}O)_3Si\text{-}Sp^{11}\text{-}NR^{12}\text{-}Sp^{12}\text{-}C(OR^{13})_tH_{3-t}$ | I-A |
| $(R^{11}O)_2(CH_3)Si\text{-}Sp^{11}\text{-}NR^{12}\text{-}Sp^{12}\text{-}C(OR^{13})_tH_{3-t}$ | I-B |
| $(R^{11}O)(CH_3)_2Si\text{-}Sp^{11}\text{-}NR^{12}\text{-}Sp^{12}\text{-}C(OR^{13})_tH_{3-t}$ | I-C |
| $(CH_3)_3Si\text{-}Sp^{11}\text{-}NR^{12}\text{-}Sp^{12}\text{-}C(OR^{13})_tH_{3-t}$ | I-D |

Wherein the parameter $R^{11}$ to $R^{13}$, $Sp^{11}$, $Sp^{12}$ and t have one of the meanings as given above-under formula I.

In another preferred embodiment, the compounds of formula I are selected from the group of compounds of the following formula,

| | |
|---|---|
| $(R^{11}O)_3Si\text{-}Sp^{11}\text{-}NR^{12}\text{-}Sp^{12}\text{-}C(OR^{13})_3$ | I-A-1 |
| $(R^{11}O)_3Si\text{-}Sp^{11}\text{-}NR^{12}\text{-}Sp^{12}\text{-}C(OR^{13})_2H$ | I-A-2 |
| $(R^{11}O)_3Si\text{-}Sp^{11}\text{-}NR^{12}\text{-}Sp^{12}\text{-}C(OR^{13})_1H_2$ | I-A-3 |
| $(R^{11}O)_3Si\text{-}Sp^{11}\text{-}NR^{12}\text{-}Sp^{12}\text{-}CH_3$ | I-A-4 |
| $(R^{11}O)_2(CH_3)Si\text{-}Sp^{11}\text{-}NR^{12}\text{-}Sp^{12}\text{-}C(OR^{13})_3$ | I-B-1 |
| $(R^{11}O)_2(CH_3)Si\text{-}Sp^{11}\text{-}NR^{12}\text{-}Sp^{12}\text{-}C(OR^{13})_2H$ | I-B-2 |
| $(R^{11}O)_2(CH_3)Si\text{-}Sp^{11}\text{-}NR^{12}\text{-}Sp^{12}\text{-}C(OR^{13})H_2$ | I-B-3 |

| | |
|---|---|
| $(R^{11}O)_2(CH_3)Si-Sp^{11}-NR^{12}-Sp^{12}-CH_3$ | I-B-4 |
| $(R^{11}O)(CH_3)_2Si-Sp^{11}-NR^{12}-Sp^{12}-C(OR^{13})_3$ | I-C-1 |
| $(R^{11}O)(CH_3)_2Si-Sp^{11}-NR^{12}-Sp^{12}-C(OR^{13})_2H$ | I-C-2 |
| $(R^{11}O)(CH_3)_2Si-Sp^{11}-NR^{12}-Sp^{12}-C(OR^{13})H_2$ | I-C-3 |
| $(R^{11}O)(CH_3)_2Si-Sp^{11}-NR^{12}-Sp^{12}-CH_3$ | I-C-4 |
| $(CH_3)_3Si-Sp^{11}-NR^{12}-Sp^{12}-C(OR^{13})_3$ | I-D-1 |
| $(CH_3)_3Si-Sp^{11}-NR^{12}-Sp^{12}-C(OR^{13})_2H$ | I-D-2 |
| $(CH_3)_3Si-Sp^{11}-NR^{12}-Sp^{12}-C(OR^{13})H_2$ | I-D-3 |
| $(CH_3)_3Si-Sp^{11}-NR^{12}-Sp^{12}-CH_3$ | I-D-4 |

Wherein the parameter $R^{11}$ to $R^{13}$, $Sp^{11}$ and $Sp^{12}$ have one of the meanings as given above-under formula I.

Preferably, in the compounds of formula I-A-1 to I-C-4, $R^{11}$ denotes each and independently from another a methyl or ethyl radical, more preferably in each occurrence $R^{11}$ denotes a methyl or ethyl radical, most preferably a methyl radical.

Preferably, in the compounds of formula I-A-1 to I-D-4, $R^{13}$ denotes each and independently from another a methyl or ethyl radical, more preferably in each occurrence $R^{13}$ denotes independently from another a methyl or ethyl radical, most preferably in each occurrence a methyl or ethyl radical most preferably in each occurrence a methyl radical.

Preferably, in the compounds of formula I-A-1 to I-D-4, $Sp^{12}$ denotes each and independently from another a methylene or ethylene spacer, more preferably $Sp^{12}$ denotes an ethylene spacer.

Preferably, in the compounds of formula I-A-1 to I-D-4, $Sp^{11}$ denotes a methylene, ethylene, propylene, butylene spacer, more preferably, $Sp^1$ denotes a straight n-propylene or a branched sec-butylene spacer.

Preferably, in the compounds of formula I-A-1 to I-D-4, $R^{12}$ denotes H or an alkylene or alkoxy radical, more preferably, $R^{12}$ denotes H.

More preferably, the compounds of formula I are selected from compounds of the following subformulae

| | |
|---|---|
| $(MeO)_3Si-Sp^{11}-NR^{12}-Sp^{12}-C(OR^{13})_3$ | I-A-1a |
| $(MeO)_3Si-Sp^{11}-NR^{12}-Sp^{12}-C(OR^{13})_2H$ | I-A-2a |
| $(MeO)_3Si-Sp^{11}-NR^{12}-Sp^{12}-C(OR^{13})H_2$ | I-A-3a |
| $(MeO)_3Si-Sp^{11}-NR^{12}-Sp^{12}-CH_3$ | I-A-4a |
| $(EtO)_3Si-Sp^{11}-NR^{12}-Sp^{12}-C(OR^{13})_3$ | I-A-1b |
| $(EtO)_3Si-Sp^{11}-NR^{12}-Sp^{12}-C(OR^{13})_2H$ | I-A-2b |
| $(EtO)_3Si-Sp^{11}-NR^{12}-Sp^{12}-C(OR^{13})H_2$ | I-A-3b |
| $(EtO)_3Si-Sp^{11}-NR^{12}-Sp^{12}-CH_3$ | I-A-4b |
| $(MeO)_2(CH_3)Si-Sp^{11}-NR^{12}-Sp^{12}-C(OR^{13})_3$ | I-B-1a |
| $(MeO)_2(CH_3)Si-Sp^{11}-NR^{12}-Sp^{12}-C(OR^{13})_2H$ | I-B-2a |
| $(MeO)_2(CH_3)Si-Sp^{11}-NR^{12}-Sp^{12}-C(OR^{13})H_2$ | I-B-3a |
| $(MeO)_2(CH_3)Si-Sp^{11}-NR^{12}-Sp^{12}-CH_3$ | I-B-4a |
| $(EtO)_2(CH_3)Si-Sp^{11}-NR^{12}-Sp^{12}-C(OR^{13})_3$ | I-B-1b |
| $(EtO)_2(CH_3)Si-Sp^{11}-NR^{12}-Sp^{12}-C(OR^{13})_2H$ | I-B-2b |
| $(EtO)_2(CH_3)Si-Sp^{11}-NR^{12}-Sp^{12}-C(OR^{13})H_2$ | I-B-3b |
| $(EtO)_2(CH_3)Si-Sp^{11}-NR^{12}-Sp^{12}-CH_3$ | I-B-4b |
| $(MeO)(CH_3)_2Si-Sp^{11}-NR^{12}-Sp^{12}-C(OR^{13})_3$ | I-C-1a |
| $(MeO)(CH_3)_2Si-Sp^{11}-NR^{12}-Sp^{12}-C(OR^{13})_2H$ | I-C-2a |
| $(MeO)(CH_3)_2Si-Sp^{11}-NR^{12}-Sp^{12}-C(OR^{13})H_2$ | I-C-3a |
| $(MeO)(CH_3)_2Si-Sp^{11}-NR^{12}-Sp^{12}-CH_3$ | I-C-4a |
| $(EtO)(CH_3)_2Si-Sp^{11}-NR^{12}-Sp^{12}-C(OR^{13})_3$ | I-C-1b |
| $(EtO)(CH_3)_2Si-Sp^{11}-NR^{12}-Sp^{12}-C(OR^{13})_2H$ | I-C-2b |
| $(EtO)(CH_3)_2Si-Sp^{11}-NR^{12}-Sp^{12}-C(OR^{13})H_2$ | I-C-3b |
| $(EtO)(CH_3)_2Si-Sp^{11}-NR^{12}-Sp^{12}-CH_3$ | I-C-4b |
| $(CH_3)_3Si-Sp^{11}-NR^{12}-Sp^{12}-C(OR^{13})_3$ | I-D-1a |
| $(CH_3)_3Si-Sp^{11}-NR^{12}-Sp^{12}-C(OR^{13})_2H$ | I-D-2a |
| $(CH_3)_3Si-Sp^{11}-NR^{12}-Sp^{12}-C(OR^{13})H_2$ | I-D-3a |
| $(CH_3)_3Si-Sp^{11}-NR^{12}-Sp^{12}-CH_3$ | I-D-4a |

Wherein the parameter $R^{12}$ and $R^{13}$, $Sp^{11}$ and $Sp^{12}$ have one of the meanings as given above-under formula I, Me denotes a methyl radical and Et denotes an ethyl radical.

Further preferred compounds of formula I are selected from the group of compounds of the following formula,

| | |
|---|---|
| $(MeO)_3Si-Sp^{11}-NR^{12}-Sp^{12}-C(OMe)_3$ | I-A-1aa |
| $(MeO)_3Si-Sp^{11}-NR^{12}-Sp^{12}-C(OMe)_2H$ | I-A-2aa |
| $(MeO)_3Si-Sp^{11}-NR^{12}-Sp^{12}-C(OMe)H_2$ | I-A-3aa |
| $(MeO)_3Si-Sp^{11}-NR^{12}-Sp^{12}-CH_3$ | I-A-4aa |
| $(EtO)_3Si-Sp^{11}-NR^{12}-Sp^{12}-C(OMe)_3$ | I-A-1bb |
| $(EtO)_3Si-Sp^{11}-NR^{12}-Sp^{12}-C(OMe)_2H$ | I-A-2bb |
| $(EtO)_3Si-Sp^{11}-NR^{12}-Sp^{12}-C(OMe)H_2$ | I-A-3bb |
| $(EtO)_3Si-Sp^{11}-NR^{12}-Sp^{12}-CH_3$ | I-A-4bb |
| $(MeO)_3Si-Sp^{11}-NR^{12}-Sp^{12}-C(OEt)_3$ | I-A-1ab |
| $(MeO)_3Si-Sp^{11}-NR^{12}-Sp^{12}-C(OEt)_2H$ | I-A-2ab |
| $(MeO)_3Si-Sp^{11}-NR^{12}-Sp^{12}-C(OEt)H_2$ | I-A-3ab |
| $(MeO)_3Si-Sp^{11}-NR^{12}-Sp^{12}-CH_3$ | I-A-4ab |
| $(EtO)_3Si-Sp^{11}-NR^{12}-Sp^{12}-C(OEt)_3$ | I-A-1ba |
| $(EtO)_3Si-Sp^{11}-NR^{12}-Sp^{12}-C(OEt)_2H$ | I-A-2ba |
| $(EtO)_3Si-Sp^{11}-NR^{12}-Sp^{12}-C(OEt)H_2$ | I-A-3ba |
| $(EtO)_3Si-Sp^{11}-NR^{12}-Sp^{12}-CH_3$ | I-A-4ba |
| $(MeO)_2(CH_3)Si-Sp^{11}-NR^{12}-Sp^{12}-C(OMe)_3$ | I-B-1aa |
| $(MeO)_2(CH_3)Si-Sp^{11}-NR^{12}-Sp^{12}-C(OMe)_2H$ | I-B-2aa |
| $(MeO)_2(CH_3)Si-Sp^{11}-NR^{12}-Sp^{12}-C(OMe)H_2$ | I-B-3aa |
| $(MeO)_2(CH_3)Si-Sp^{11}-NR^{12}-Sp^{12}-CH_3$ | I-B-4aa |

| | |
|---|---|
| $(EtO)_2(CH_3)Si-Sp^{11}-NR^{12}-Sp^{12}-C(OMe)_3$ | I-B-1bb |
| $(EtO)_2(CH_3)Si-Sp^{11}-NR^{12}-Sp^{12}-C(OMe)_2H$ | I-B-2bb |
| $(EtO)_2(CH_3)Si-Sp^{11}-NR^{12}-Sp^{12}-C(OMe)H_2$ | I-B-3bb |
| $(EtO)_2(CH_3)Si-Sp^{11}-NR^{12}-Sp^{12}-CH_3$ | I-B-4bb |
| $(MeO)_2(CH_3)Si-Sp^{11}-NR^{12}-Sp^{12}-C(OEt)_3$ | I-B-1ab |
| $(MeO)_2(CH_3)Si-Sp^{11}-NR^{12}-Sp^{12}-C(OEt)_2H$ | I-B-2ab |
| $(MeO)_2(CH_3)Si-Sp^{11}-NR^{12}-Sp^{12}-C(OEt)H_2$ | I-B-3ab |
| $(MeO)_2(CH_3)Si-Sp^{11}-NR^{12}-Sp^{12}-CH_3$ | I-B-4ab |
| $(EtO)_2(CH_3)Si-Sp^{11}-NR^{12}-Sp^{12}-C(OEt)_3$ | I-B-1ba |
| $(EtO)_2(CH_3)Si-Sp^{11}-NR^{12}-Sp^{12}-C(OEt)_2H$ | I-B-2ba |
| $(EtO)_2(CH_3)Si-Sp^{11}-NR^{12}-Sp^{12}-C(OEt)H_2$ | I-B-3ba |
| $(EtO)_2(CH_3)Si-Sp^{11}-NR^{12}-Sp^{12}-CH_3$ | I-B-4ba |
| $(MeO)(CH_3)_2Si-Sp^{11}-NR^{12}-Sp^{12}-C(OMe)_3$ | I-C-1aa |
| $(MeO)(CH_3)_2Si-Sp^{11}-NR^{12}-Sp^{12}-C(OMe)_2H$ | I-C-2aa |
| $(MeO)(CH_3)_2Si-Sp^{11}-NR^{12}-Sp^{12}-C(OMe)H_2$ | I-C-3aa |
| $(MeO)(CH_3)_2Si-Sp^{11}-NR^{12}-Sp^{12}-CH_3$ | I-C-4aa |
| $(EtO)(CH_3)_2Si-Sp^{11}-NR^{12}-Sp^{12}-C(OMe)_3$ | I-C-1bb |
| $(EtO)(CH_3)_2Si-Sp^{11}-NR^{12}-Sp^{12}-C(OMe)_2H$ | I-C-2bb |
| $(EtO)(CH_3)_2Si-Sp^{11}-NR^{12}-Sp^{12}-C(OMe)H_2$ | I-C-3bb |
| $(EtO)(CH_3)_2Si-Sp^{11}-NR^{12}-Sp^{12}-CH_3$ | I-C-4bb |
| $(MeO)(CH_3)_2Si-Sp^{11}-NR^{12}-Sp^{12}-C(OEt)_3$ | I-C-1ab |
| $(MeO)(CH_3)_2Si-Sp^{11}-NR^{12}-Sp^{12}-C(OEt)_2H$ | I-C-2ab |
| $(MeO)(CH_3)_2Si-Sp^{11}-NR^{12}-Sp^{12}-C(OEt)H_2$ | I-C-3ab |
| $(MeO)(CH_3)_2Si-Sp^{11}-NR^{12}-Sp^{12}-CH_3$ | I-C-4ab |
| $(EtO)(CH_3)_2Si-Sp^{11}-NR^{12}-Sp^{12}-C(OEt)_3$ | I-C-1ba |
| $(EtO)(CH_3)_2Si-Sp^{11}-NR^{12}-Sp^{12}-C(OEt)_2H$ | I-C-2ba |
| $(EtO)(CH_3)_2Si-Sp^{11}-NR^{12}-Sp^{12}-C(OEt)H_2$ | I-C-3ba |
| $(EtO)(CH_3)_2Si-Sp^{11}-NR^{12}-Sp^{12}-CH_3$ | I-C-4ba |
| $(CH_3)_3Si-Sp^{11}-NR^{12}-Sp^{12}-C(OMe)_3$ | I-D-1aa |
| $(CH_3)_3Si-Sp^{11}-NR^{12}-Sp^{12}-C(OMe)_2H$ | I-D-2aa |
| $(CH_3)_3Si-Sp^{11}-NR^{12}-Sp^{12}-C(OMe)H_2$ | I-D-3aa |
| $(CH_3)_3Si-Sp^{11}-NR^{12}-Sp^{12}-CH_3$ | I-D-4aa |
| $(CH_3)_3Si-Sp^{11}-NR^{12}-Sp^{12}-C(OEt)_3$ | I-D-1bb |
| $(CH_3)_3Si-Sp^{11}-NR^{12}-Sp^{12}-C(OEt)_2H$ | I-D-2bb |
| $(CH_3)_3Si-Sp^{11}-NR^{12}-Sp^{12}-C(OEt)H_2$ | I-D-3bb |
| $(CH_3)_3Si-Sp^{11}-NR^{12}-Sp^{12}-CH_3$ | I-D-4bb |

Wherein the parameter $R^{12}$, $Sp^{11}$ and $Sp^{12}$ have one of the meanings as given above-under formula I, Me denotes a methyl radical and Et denotes an ethyl radical.

Further preferred compounds of formula I are selected from the group of compounds of the following formula,

| | |
|---|---|
| $(MeO)_3Si-Sp^{11}-NR^{12}-CH_2-C(OMe)_3$ | I-A-A |
| $(MeO)_3Si-Sp^{11}-NR^{12}-CH_2-C(OMe)_2H$ | I-A-B |
| $(MeO)_3Si-Sp^{11}-NR^{12}-CH_2-C(OMe)H_2$ | I-A-C |
| $(MeO)_3Si-Sp^{11}-NR^{12}-CH_2-CH_3$ | I-A-D |
| $(EtO)_3Si-Sp^{11}-NR^{12}-CH_2-C(OMe)_3$ | I-A-E |
| $(EtO)_3Si-Sp^{11}-NR^{12}-CH_2-C(OMe)_2H$ | I-A-F |
| $(EtO)_3Si-Sp^{11}-NR^{12}-CH_2-C(OMe)H_2$ | I-A-G |
| $(EtO)_3Si-Sp^{11}-NR^{12}-CH_2-CH_3$ | I-A-H |
| $(MeO)_3Si-Sp^{11}-NR^{12}-CH_2-C(OEt)_3$ | I-A-I |
| $(MeO)_3Si-Sp^{11}-NR^{12}-CH_2-C(OEt)_2H$ | I-A-J |
| $(MeO)_3Si-Sp^{11}-NR^{12}-CH_2-C(OEt)H_2$ | I-A-K |
| $(MeO)_3Si-Sp^{11}-NR^{12}-CH_2-CH_3$ | I-A-L |
| $(EtO)_3Si-Sp^{11}-NR^{12}-CH_2-C(OEt)_3$ | I-A-M |
| $(EtO)_3Si-Sp^{11}-NR^{12}-CH_2-C(OEt)_2H$ | I-A-N |
| $(EtO)_3Si-Sp^{11}-NR^{12}-CH_2-C(OEt)H_2$ | I-A-O |
| $(EtO)_3Si-Sp^{11}-NR^{12}-CH_2-CH_3$ | I-A-P |
| $(MeO)_3Si-Sp^{11}-NR^{12}-CH_2-CH_2-C(OMe)_3$ | I-A-AA |
| $(MeO)_3Si-Sp^{11}-NR^{12}-CH_2-CH_2-C(OMe)_2H$ | I-A-BB |
| $(MeO)_3Si-Sp^{11}-NR^{12}-CH_2-CH_2-C(OMe)H_2$ | I-A-CC |
| $(MeO)_3Si-Sp^{11}-NR^{12}-CH_2-CH_2-CH_3$ | I-A-DD |
| $(EtO)_3Si-Sp^{11}-NR^{12}-CH_2-CH_2-C(OMe)_3$ | I-A-EE |
| $(EtO)_3Si-Sp^{11}-NR^{12}-CH_2-CH_2-C(OMe)_2H$ | I-A-FF |
| $(EtO)_3Si-Sp^{11}-NR^{12}-CH_2-CH_2-C(OMe)H_2$ | I-A-GG |
| $(EtO)_3Si-Sp^{11}-NR^{12}-CH_2-CH_2-CH_3$ | I-A-HH |
| $(MeO)_3Si-Sp^{11}-NR^{12}-CH_2-CH_2-C(OEt)_3$ | I-A-II |
| $(MeO)_3Si-Sp^{11}-NR^{12}-CH_2-CH_2-C(OEt)_2H$ | I-A-JJ |
| $(MeO)_3Si-Sp^{11}-NR^{12}-CH_2-CH_2-C(OEt)H_2$ | I-A-KK |
| $(MeO)_3Si-Sp^{11}-NR^{12}-CH_2-CH_2-CH_3$ | I-A-LL |
| $(EtO)_3Si-Sp^{11}-NR^{12}-CH_2-CH_2-C(OEt)_3$ | I-A-MM |
| $(EtO)_3Si-Sp^{11}-NR^{12}-CH_2-CH_2-C(OEt)_2H$ | I-A-NN |
| $(EtO)_3Si-Sp^{11}-NR^{12}-CH_2-CH_2-C(OEt)H_2$ | I-A-OO |
| $(EtO)_3Si-Sp^{11}-NR^{12}-CH_2-CH_2-CH_3$ | I-A-PP |
| $(MeO)_2(CH_3)Si-Sp^{11}-NR^{12}-CH_2-C(OMe)_3$ | I-B-A |
| $(MeO)_2(CH_3)Si-Sp^{11}-NR^{12}-CH_2-C(OMe)_2H$ | I-B-B |

| Compound | Code |
|---|---|
| (MeO)$_2$(CH$_3$)Si-Sp$^{11}$-NR$^{12}$—CH$_2$—C(OMe)H$_2$ | I-B-C |
| (MeO)$_2$(CH$_3$)Si-Sp$^{11}$-NR$^{12}$—CH$_2$—CH$_3$ | I-B-D |
| (EtO)$_2$(CH$_3$)Si-Sp$^{11}$-NR$^{12}$—CH$_2$—C(OMe)$_3$ | I-B-E |
| (EtO)$_2$(CH$_3$)Si-Sp$^{11}$-NR$^{12}$—CH$_2$—C(OMe)$_2$H | I-B-F |
| (EtO)$_2$(CH$_3$)Si-Sp$^{11}$-NR$^{12}$—CH$_2$—C(OMe)H$_2$ | I-B-G |
| (EtO)$_2$(CH$_3$)Si-Sp$^{11}$-NR$^{12}$—CH$_2$—CH$_3$ | I-B-H |
| (MeO)$_2$(CH$_3$)Si-Sp$^{11}$-NR$^{12}$—CH$_2$—C(OEt)$_3$ | I-B-I |
| (MeO)$_2$(CH$_3$)Si-Sp$^{11}$-NR$^{12}$—CH$_2$—C(OEt)$_2$H | I-B-J |
| (MeO)$_2$(CH$_3$)Si-Sp$^{11}$-NR$^{12}$—CH$_2$—C(OEt)H$_2$ | I-B-K |
| (MeO)$_2$(CH$_3$)Si-Sp$^{11}$-NR$^{12}$—CH$_2$—CH$_3$ | I-B-L |
| (EtO)$_2$(CH$_3$)Si-Sp$^{11}$-NR$^{12}$—CH$_2$—C(OEt)$_3$ | I-B-M |
| (EtO)$_2$(CH$_3$)Si-Sp$^{11}$-NR$^{12}$—CH$_2$—C(OEt)$_2$H | I-B-N |
| (EtO)$_2$(CH$_3$)Si-Sp$^{11}$-NR$^{12}$—CH$_2$—C(OEt)H$_2$ | I-B-O |
| (EtO)$_2$(CH$_3$)Si-Sp$^{11}$-NR$^{12}$—CH$_2$—CH$_3$ | I-B-P |
| (MeO)$_2$(CH$_3$)Si-Sp$^{11}$-NR$^{12}$—CH$_2$—CH$_2$—C(OMe)$_3$ | I-B-AA |
| (MeO)$_2$(CH$_3$)Si-Sp$^{11}$-NR$^{12}$—CH$_2$—CH$_2$—C(OMe)$_2$H | I-B-BB |
| (MeO)$_2$(CH$_3$)Si-Sp$^{11}$-NR$^{12}$—CH$_2$—CH$_2$—C(OMe)H$_2$ | I-B-CC |
| (MeO)$_2$(CH$_3$)Si-Sp$^{11}$-NR$^{12}$—CH$_2$—CH$_2$—CH$_3$ | I-B-DD |
| (EtO)$_2$(CH$_3$)Si-Sp$^{11}$-NR$^{12}$—CH$_2$—CH$_2$—C(OMe)$_3$ | I-B-EE |
| (EtO)$_2$(CH$_3$)Si-Sp$^{11}$-NR$^{12}$—CH$_2$—CH$_2$—C(OMe)$_2$H | I-B-FF |
| (EtO)$_2$(CH$_3$)Si-Sp$^{11}$-NR$^{12}$—CH$_2$—CH$_2$—C(OMe)H$_2$ | I-B-GG |
| (EtO)$_2$(CH$_3$)Si-Sp$^{11}$-NR$^{12}$—CH$_2$—CH$_2$—CH$_3$ | I-B-HH |
| (MeO)$_2$(CH$_3$)Si-Sp$^{11}$-NR$^{12}$—CH$_2$—CH$_2$—C(OEt)$_3$ | I-B-II |
| (MeO)$_2$(CH$_3$)Si-Sp$^{11}$-NR$^{12}$—CH$_2$—CH$_2$—C(OEt)$_2$H | I-B-JJ |
| (MeO)$_2$(CH$_3$)Si-Sp$^{11}$-NR$^{12}$—CH$_2$—CH$_2$—C(OEt)H$_2$ | I-B-KK |
| (MeO)$_2$(CH$_3$)Si-Sp$^{11}$-NR$^{12}$—CH$_2$—CH$_2$—CH$_3$ | I-B-LL |
| (EtO)$_2$(CH$_3$)Si-Sp$^{11}$-NR$^{12}$—CH$_2$—CH$_2$—C(OEt)$_3$ | I-B-MM |
| (EtO)$_2$(CH$_3$)Si-Sp$^{11}$-NR$^{12}$—CH$_2$—CH$_2$—C(OEt)$_2$H | I-B-NN |
| (EtO)$_2$(CH$_3$)Si-Sp$^{11}$-NR$^{12}$—CH$_2$—CH$_2$—C(OEt)H$_2$ | I-B-OO |
| (EtO)$_2$(CH$_3$)Si-Sp$^{11}$-NR$^{12}$—CH$_2$—CH$_2$—CH$_3$ | I-B-PP |
| (MeO)(CH$_3$)$_2$Si-Sp$^{11}$-NR$^{12}$—CH$_2$—C(OMe)$_3$ | I-C-A |
| (MeO)(CH$_3$)$_2$Si-Sp$^{11}$-NR$^{12}$—CH$_2$—C(OMe)$_2$H | I-C-B |
| (MeO)(CH$_3$)$_2$Si-Sp$^{11}$-NR$^{12}$—CH$_2$—C(OMe)H$_2$ | I-C-C |
| (MeO)(CH$_3$)$_2$Si-Sp$^{11}$-NR$^{12}$—CH$_2$—CH$_3$ | I-C-D |
| (EtO)(CH$_3$)$_2$Si-Sp$^{11}$-NR$^{12}$—CH$_2$—C(OMe)$_3$ | I-C-E |
| (EtO)(CH$_3$)$_2$Si-Sp$^{11}$-NR$^{12}$—CH$_2$—C(OMe)$_2$H | I-C-F |
| (EtO)(CH$_3$)$_2$Si-Sp$^{11}$-NR$^{12}$—CH$_2$—C(OMe)H$_2$ | I-C-G |
| (EtO)(CH$_3$)$_2$Si-Sp$^{11}$-NR$^{12}$—CH$_2$—CH$_3$ | I-C-H |
| (MeO)(CH$_3$)$_2$Si-Sp$^{11}$-NR$^{12}$—CH$_2$—C(OEt)$_3$ | I-C-I |
| (MeO)(CH$_3$)$_2$Si-Sp$^{11}$-NR$^{12}$—CH$_2$—C(OEt)$_2$H | I-C-J |
| (MeO)(CH$_3$)$_2$Si-Sp$^{11}$-NR$^{12}$—CH$_2$—C(OEt)H$_2$ | I-C-K |
| (MeO)(CH$_3$)$_2$Si-Sp$^{11}$-NR$^{12}$—CH$_2$—CH$_3$ | I-C-L |
| (EtO)(CH$_3$)$_2$Si-Sp$^{11}$-NR$^{12}$—CH$_2$—C(OEt)$_3$ | I-C-M |
| (EtO)(CH$_3$)$_2$Si-Sp$^{11}$-NR$^{12}$—CH$_2$—C(OEt)$_2$H | I-C-N |
| (EtO)(CH$_3$)$_2$Si-Sp$^{11}$-NR$^{12}$—CH$_2$—C(OEt)H$_2$ | I-C-O |
| (EtO)(CH$_3$)$_2$Si-Sp$^{11}$-NR$^{12}$—CH$_2$—CH$_3$ | I-C-P |
| (MeO)(CH$_3$)$_2$Si-Sp$^{11}$-NR$^{12}$—CH$_2$—CH$_2$—C(OMe)$_3$ | I-C-AA |
| (MeO)(CH$_3$)$_2$Si-Sp$^{11}$-NR$^{12}$—CH$_2$—CH$_2$—C(OMe)$_2$H | I-C-BB |
| (MeO)(CH$_3$)$_2$Si-Sp$^{11}$-NR$^{12}$—CH$_2$—CH$_2$—C(OMe)H$_2$ | I-C-CC |
| (MeO)(CH$_3$)$_2$Si-Sp$^{11}$-NR$^{12}$—CH$_2$—CH$_2$—CH$_3$ | I-C-DD |
| (EtO)(CH$_3$)$_2$Si-Sp$^{11}$-NR$^{12}$—CH$_2$—CH$_2$—C(OMe)$_3$ | I-C-EE |
| (EtO)(CH$_3$)$_2$Si-Sp$^{11}$-NR$^{12}$—CH$_2$—CH$_2$—C(OMe)$_2$H | I-C-FF |
| (EtO)(CH$_3$)$_2$Si-Sp$^{11}$-NR$^{12}$—CH$_2$—CH$_2$—C(OMe)H$_2$ | I-C-GG |
| (EtO)(CH$_3$)$_2$Si-Sp$^{11}$-NR$^{12}$—CH$_2$—CH$_2$—CH$_3$ | I-C-HH |
| (MeO)(CH$_3$)$_2$Si-Sp$^{11}$-NR$^{12}$—CH$_2$—CH$_2$—C(OEt)$_3$ | I-C-II |
| (MeO)(CH$_3$)$_2$Si-Sp$^{11}$-NR$^{12}$—CH$_2$—CH$_2$—C(OEt)$_2$H | I-C-JJ |
| (MeO)(CH$_3$)$_2$Si-Sp$^{11}$-NR$^{12}$—CH$_2$—CH$_2$—C(OEt)H$_2$ | I-C-KK |
| (MeO)(CH$_3$)$_2$Si-Sp$^{11}$-NR$^{12}$—CH$_2$—CH$_2$—CH$_3$ | I-C-LL |
| (EtO)(CH$_3$)$_2$Si-Sp$^{11}$-NR$^{12}$—CH$_2$—CH$_2$—C(OEt)$_3$ | I-C-MM |
| (EtO)(CH$_3$)$_2$Si-Sp$^{11}$-NR$^{12}$—CH$_2$—CH$_2$—C(OEt)$_2$H | I-C-NN |
| (EtO)(CH$_3$)$_2$Si-Sp$^{11}$-NR$^{12}$—CH$_2$—CH$_2$—C(OEt)H$_2$ | I-C-OO |
| (EtO)(CH$_3$)$_2$Si-Sp$^{11}$-NR$^{12}$—CH$_2$—CH$_2$—CH$_3$ | I-C-PP |
| (CH$_3$)$_3$Si-Sp$^{11}$-NR$^{12}$—CH$_2$—C(OMe)$_3$ | I-D-A |
| (CH$_3$)$_3$Si-Sp$^{11}$-NR$^{12}$—CH$_2$—C(OMe)$_2$H | I-D-B |
| (CH$_3$)$_3$Si-Sp$^{11}$-NR$^{12}$—CH$_2$—C(OMe)H$_2$ | I-D-C |
| (CH$_3$)$_3$Si-Sp$^{11}$-NR$^{12}$—CH$_2$—CH$_3$ | I-D-D |
| (CH$_3$)$_3$Si-Sp$^{11}$-NR$^{12}$—CH$_2$—C(OEt)$_3$ | I-D-E |
| (CH$_3$)$_3$Si-Sp$^{11}$-NR$^{12}$—CH$_2$—C(OEt)$_2$H | I-D-F |
| (CH$_3$)$_3$Si-Sp$^{11}$-NR$^{12}$—CH$_2$—C(OEt)H$_2$ | I-D-G |
| (CH$_3$)$_3$Si-Sp$^{11}$-NR$^{12}$—CH$_2$—CH$_3$ | I-D-H |
| (CH$_3$)$_3$Si-Sp$^{11}$-NR$^{12}$—CH$_2$—CH$_2$—C(OMe)$_3$ | I-D-AA |
| (CH$_3$)$_3$Si-Sp$^{11}$-NR$^{12}$—CH$_2$—CH$_2$—C(OMe)$_2$H | I-D-BB |

| | |
|---|---|
| $(CH_3)_3Si-Sp^{11}-NR^{12}-CH_2-CH_2-C(OMe)H_2$ | I-D-CC |
| $(CH_3)_3Si-Sp^{11}-NR^{12}-CH_2-CH_2-CH_3$ | I-D-DD |
| $(CH_3)_3Si-Sp^{11}-NR^{12}-CH_2-CH_2-C(OEt)_3$ | I-D-EE |
| $(CH_3)_3Si-Sp^{11}-NR^{12}-CH_2-CH_2-C(OEt)_2H$ | I-D-FF |
| $(CH_3)_3Si-Sp^{11}-NR^{12}-CH_2-CH_2-C(OEt)H_2$ | I-D-GG |
| $(CH_3)_3Si-Sp^{11}-NR^{12}-CH_2-CH_2-CH_3$ | I-D-HH |

Wherein the parameter $R^{12}$ and $Sp^{11}$ have one of the meanings as given above-under formula I, Me denotes a methyl radical and Et denotes an ethyl radical.

Further preferred compounds of formula I are selected from the group of compounds of the following formula,

| | |
|---|---|
| $(MeO)_3Si-Sp^{11}-NH-CH_2-C(OMe)_3$ | A-1 |
| $(MeO)_3Si-Sp^{11}-NH-CH_2-C(OMe)_2H$ | A-2 |
| $(MeO)_3Si-Sp^{11}-NH-CH_2-C(OMe)H_2$ | A-3 |
| $(MeO)_3Si-Sp^{11}-NH-CH_2-CH_3$ | A-4 |
| $(EtO)_3Si-Sp^{11}-NH-CH_2-C(OMe)_3$ | A-5 |
| $(EtO)_3Si-Sp^{11}-NH-CH_2-C(OMe)_2H$ | A-6 |
| $(EtO)_3Si-Sp^{11}-NH-CH_2-C(OMe)H_2$ | A-7 |
| $(EtO)_3Si-Sp^{11}-NH-CH_2-CH_3$ | A-8 |
| $(MeO)_3Si-Sp^{11}-NH-CH_2-C(OEt)_3$ | A-9 |
| $(MeO)_3Si-Sp^{11}-NH-CH_2-C(OEt)_2H$ | A-10 |
| $(MeO)_3Si-Sp^{11}-NH-CH_2-C(OEt)H_2$ | A-11 |
| $(MeO)_3Si-Sp^{11}-NH-CH_2-CH_3$ | A-12 |
| $(EtO)_3Si-Sp^{11}-NH-CH_2-C(OEt)_3$ | A-13 |
| $(EtO)_3Si-Sp^{11}-NH-CH_2-C(OEt)_2H$ | A-14 |
| $(EtO)_3Si-Sp^{11}-NH-CH_2-C(OEt)H_2$ | A-15 |
| $(EtO)_3Si-Sp^{11}-NH-CH_2-CH_3$ | A-16 |
| $(MeO)_3Si-Sp^{11}-NH-CH_2-CH_2-C(OMe)_3$ | A-17 |
| $(MeO)_3Si-Sp^{11}-NH-CH_2-CH_2-C(OMe)_2H$ | A-18 |
| $(MeO)_3Si-Sp^{11}-NH-CH_2-CH_2-C(OMe)H_2$ | A-19 |
| $(MeO)_3Si-Sp^{11}-NH-CH_2-CH_2-CH_3$ | A-20 |
| $(EtO)_3Si-Sp^{11}-NH-CH_2-CH_2-C(OMe)_3$ | A-21 |
| $(EtO)_3Si-Sp^{11}-NH-CH_2-CH_2-C(OMe)_2H$ | A-22 |
| $(EtO)_3Si-Sp^{11}-NH-CH_2-CH_2-C(OMe)H_2$ | A-23 |
| $(EtO)_3Si-Sp^{11}-NH-CH_2-CH_2-CH_3$ | A-24 |
| $(MeO)_3Si-Sp^{11}-NH-CH_2-CH_2-C(OEt)_3$ | A-25 |
| $(MeO)_3Si-Sp^{11}-NH-CH_2-CH_2-C(OEt)_2H$ | A-26 |
| $(MeO)_3Si-Sp^{11}-NH-CH_2-CH_2-C(OEt)H_2$ | A-27 |
| $(MeO)_3Si-Sp^{11}-NH-CH_2-CH_2-CH_3$ | A-28 |
| $(EtO)_3Si-Sp^{11}-NH-CH_2-CH_2-C(OEt)_3$ | A-29 |
| $(EtO)_3Si-Sp^{11}-NH-CH_2-CH_2-C(OEt)_2H$ | A-30 |
| $(EtO)_3Si-Sp^{11}-NH-CH_2-CH_2-C(OEt)H_2$ | A-31 |
| $(EtO)_3Si-Sp^{11}-NH-CH_2-CH_2-CH_3$ | A-32 |
| $(MeO)_2(CH_3)Si-Sp^{11}-NH-CH_2-C(OMe)_3$ | B-1 |
| $(MeO)_2(CH_3)Si-Sp^{11}-NH-CH_2-C(OMe)_2H$ | B-2 |
| $(MeO)_2(CH_3)Si-Sp^{11}-NH-CH_2-C(OMe)H_2$ | B-3 |
| $(MeO)_2(CH_3)Si-Sp^{11}-NH-CH_2-CH_3$ | B-4 |
| $(EtO)_2(CH_3)Si-Sp^{11}-NH-CH_2-C(OMe)_3$ | B-5 |
| $(EtO)_2(CH_3)Si-Sp^{11}-NH-CH_2-C(OMe)_2H$ | B-6 |
| $(EtO)_2(CH_3)Si-Sp^{11}-NH-CH_2-C(OMe)H_2$ | B-7 |
| $(EtO)_2(CH_3)Si-Sp^{11}-NH-CH_2-CH_3$ | B-8 |
| $(MeO)_2(CH_3)Si-Sp^{11}-NH-CH_2-C(OEt)_3$ | B-9 |
| $(MeO)_2(CH_3)Si-Sp^{11}-NH-CH_2-C(OEt)_2H$ | B-10 |
| $(MeO)_2(CH_3)Si-Sp^{11}-NH-CH_2-C(OEt)H_2$ | B-11 |
| $(MeO)_2(CH_3)Si-Sp^{11}-NH-CH_2-CH_3$ | B-12 |
| $(EtO)_2(CH_3)Si-Sp^{11}-NH-CH_2-C(OEt)_3$ | B-13 |
| $(EtO)_2(CH_3)Si-Sp^{11}-NH-CH_2-C(OEt)_2H$ | B-14 |
| $(EtO)_2(CH_3)Si-Sp^{11}-NH-CH_2-C(OEt)H_2$ | B-15 |
| $(EtO)_2(CH_3)Si-Sp^{11}-NH-CH_2-CH_3$ | B-16 |
| $(MeO)_2(CH_3)Si-Sp^{11}-NH-CH_2-CH_2-C(OMe)_3$ | B-17 |
| $(MeO)_2(CH_3)Si-Sp^{11}-NH-CH_2-CH_2-C(OMe)_2H$ | B-18 |
| $(MeO)_2(CH_3)Si-Sp^{11}-NH-CH_2-CH_2-C(OMe)H_2$ | B-19 |
| $(MeO)_2(CH_3)Si-Sp^{11}-NH-CH_2-CH_2-CH_3$ | B-20 |
| $(EtO)_2(CH_3)Si-Sp^{11}-NH-CH_2-CH_2-C(OMe)_3$ | B-21 |
| $(EtO)_2(CH_3)Si-Sp^{11}-NH-CH_2-CH_2-C(OMe)_2H$ | B-22 |
| $(EtO)_2(CH_3)Si-Sp^{11}-NH-CH_2-CH_2-C(OMe)H_2$ | B-33 |
| $(EtO)_2(CH_3)Si-Sp^{11}-NH-CH_2-CH_2-CH_3$ | B-24 |
| $(MeO)_2(CH_3)Si-Sp^{11}-NH-CH_2-CH_2-C(OEt)_3$ | B-25 |
| $(MeO)_2(CH_3)Si-Sp^{11}-NH-CH_2-CH_2-C(OEt)_2H$ | B-26 |
| $(MeO)_2(CH_3)Si-Sp^{11}-NH-CH_2-CH_2-C(OEt)H_2$ | B-27 |
| $(MeO)_2(CH_3)Si-Sp^{11}-NH-CH_2-CH_2-CH_3$ | B-28 |
| $(EtO)_2(CH_3)Si-Sp^{11}-NH-CH_2-CH_2-C(OEt)_3$ | B-29 |
| $(EtO)_2(CH_3)Si-Sp^{11}-NH-CH_2-CH_2-C(OEt)_2H$ | B-30 |
| $(EtO)_2(CH_3)Si-Sp^{11}-NH-CH_2-CH_2-C(OEt)H_2$ | B-31 |
| $(EtO)_2(CH_3)Si-Sp^{11}-NH-CH_2-CH_2-CH_3$ | B-32 |
| $(MeO)(CH_3)_2Si-Sp^{11}-NH-CH_2-C(OMe)_3$ | C-1 |

| Compound | Code |
|---|---|
| $(MeO)(CH_3)_2Si\text{-}Sp^{11}\text{-}NH\text{—}CH_2\text{—}C(OMe)_2H$ | C-2 |
| $(MeO)(CH_3)_2Si\text{-}Sp^{11}\text{-}NH\text{—}CH_2\text{—}C(OMe)H_2$ | C-3 |
| $(MeO)(CH_3)_2Si\text{-}Sp^{11}\text{-}NH\text{—}CH_2\text{—}CH_3$ | C-4 |
| $(EtO)(CH_3)_2Si\text{-}Sp^{11}\text{-}NH\text{—}CH_2\text{—}C(OMe)_3$ | C-5 |
| $(EtO)(CH_3)_2Si\text{-}Sp^{11}\text{-}NH\text{—}CH_2\text{—}C(OMe)_2H$ | C-6 |
| $(EtO)(CH_3)_2Si\text{-}Sp^{11}\text{-}NH\text{—}CH_2\text{—}C(OMe)H_2$ | C-7 |
| $(EtO)(CH_3)_2Si\text{-}Sp^{11}\text{-}NH\text{—}CH_2\text{—}CH_3$ | C-8 |
| $(MeO)(CH_3)_2Si\text{-}Sp^{11}\text{-}NH\text{—}CH_2\text{—}C(OEt)_3$ | C-9 |
| $(MeO)(CH_3)_2Si\text{-}Sp^{11}\text{-}NH\text{—}CH_2\text{—}C(OEt)_2H$ | C-10 |
| $(MeO)(CH_3)_2Si\text{-}Sp^{11}\text{-}NH\text{—}CH_2\text{—}C(OEt)H_2$ | C-11 |
| $(MeO)(CH_3)_2Si\text{-}Sp^{11}\text{-}NH\text{—}CH_2\text{—}CH_3$ | C-12 |
| $(EtO)(CH_3)_2Si\text{-}Sp^{11}\text{-}NH\text{—}CH_2\text{—}C(OEt)_3$ | C-13 |
| $(EtO)(CH_3)_2Si\text{-}Sp^{11}\text{-}NH\text{—}CH_2\text{—}C(OEt)_2H$ | C-14 |
| $(EtO)(CH_3)_2Si\text{-}Sp^{11}\text{-}NH\text{—}CH_2\text{—}C(OEt)H_2$ | C-15 |
| $(EtO)(CH_3)_2Si\text{-}Sp^{11}\text{-}NH\text{—}CH_2\text{—}CH_3$ | C-16 |
| $(MeO)(CH_3)_2Si\text{-}Sp^{11}\text{-}NH\text{—}CH_2\text{—}CH_2\text{—}C(OMe)_3$ | C-17 |
| $(MeO)(CH_3)_2Si\text{-}Sp^{11}\text{-}NH\text{—}CH_2\text{—}CH_2\text{—}C(OMe)_2H$ | C-18 |
| $(MeO)(CH_3)_2Si\text{-}Sp^{11}\text{-}NH\text{—}CH_2\text{—}CH_2\text{—}C(OMe)H_2$ | C-19 |
| $(MeO)(CH_3)_2Si\text{-}Sp^{11}\text{-}NH\text{—}CH_2\text{—}CH_2\text{—}CH_3$ | C-20 |
| $(EtO)(CH_3)_2Si\text{-}Sp^{11}\text{-}NH\text{—}CH_2\text{—}CH_2\text{—}C(OMe)_3$ | C-21 |
| $(EtO)(CH_3)_2Si\text{-}Sp^{11}\text{-}NH\text{—}CH_2\text{—}CH_2\text{—}C(OMe)_2H$ | C-22 |
| $(EtO)(CH_3)_2Si\text{-}Sp^{11}\text{-}NH\text{—}CH_2\text{—}CH_2\text{—}C(OMe)H_2$ | C-23 |
| $(EtO)(CH_3)_2Si\text{-}Sp^{11}\text{-}NH\text{—}CH_2\text{—}CH_2\text{—}CH_3$ | C-24 |
| $(MeO)(CH_3)_2Si\text{-}Sp^{11}\text{-}NH\text{—}CH_2\text{—}CH_2\text{—}C(OEt)_3$ | C-25 |
| $(MeO)(CH_3)_2Si\text{-}Sp^{11}\text{-}NH\text{—}CH_2\text{—}CH_2\text{—}C(OEt)_2H$ | C-26 |
| $(MeO)(CH_3)_2Si\text{-}Sp^{11}\text{-}NH\text{—}CH_2\text{—}CH_2\text{—}C(OEt)H_2$ | C-27 |
| $(MeO)(CH_3)_2Si\text{-}Sp^{11}\text{-}NH\text{—}CH_2\text{—}CH_2\text{—}CH_3$ | C-28 |
| $(EtO)(CH_3)_2Si\text{-}Sp^{11}\text{-}NH\text{—}CH_2\text{—}CH_2\text{—}C(OEt)_3$ | C-29 |
| $(EtO)(CH_3)_2Si\text{-}Sp^{11}\text{-}NH\text{—}CH_2\text{—}CH_2\text{—}C(OEt)_2H$ | C-30 |
| $(EtO)(CH_3)_2Si\text{-}Sp^{11}\text{-}NH\text{—}CH_2\text{—}CH_2\text{—}C(OEt)H_2$ | C-31 |
| $(EtO)(CH_3)_2Si\text{-}Sp^{11}\text{-}NH\text{—}CH_2\text{—}CH_2\text{—}CH_3$ | C-32 |
| $(CH_3)_3Si\text{-}Sp^{11}\text{-}NH\text{—}CH_2\text{—}C(OMe)_3$ | D-1 |
| $(CH_3)_3Si\text{-}Sp^{11}\text{-}NH\text{—}CH_2\text{—}C(OMe)_2H$ | D-2 |
| $(CH_3)_3Si\text{-}Sp^{11}\text{-}NH\text{—}CH_2\text{—}C(OMe)H_2$ | D-3 |
| $(CH_3)_3Si\text{-}Sp^{11}\text{-}NH\text{—}CH_2\text{—}CH_3$ | D-4 |
| $(CH_3)_3Si\text{-}Sp^{11}\text{-}NH\text{—}CH_2\text{—}C(OEt)_3$ | D-5 |
| $(CH_3)_3Si\text{-}Sp^{11}\text{-}NH\text{—}CH_2\text{—}C(OEt)_2H$ | D-6 |
| $(CH_3)_3Si\text{-}Sp^{11}\text{-}NH\text{—}CH_2\text{—}C(OEt)H_2$ | D-7 |
| $(CH_3)_3Si\text{-}Sp^{11}\text{-}NH\text{—}CH_2\text{—}CH_3$ | D-8 |
| $(CH_3)_3Si\text{-}Sp^{11}\text{-}NH\text{—}CH_2\text{—}CH_2\text{—}C(OMe)_3$ | D-9 |
| $(CH_3)_3Si\text{-}Sp^{11}\text{-}NH\text{—}CH_2\text{—}CH_2\text{—}C(OMe)_2H$ | D-10 |
| $(CH_3)_3Si\text{-}Sp^{11}\text{-}NH\text{—}CH_2\text{—}CH_2\text{—}C(OMe)H_2$ | D-11 |
| $(CH_3)_3Si\text{-}Sp^{11}\text{-}NH\text{—}CH_2\text{—}CH_2\text{—}CH_3$ | D-12 |
| $(CH_3)_3Si\text{-}Sp^{11}\text{-}NH\text{—}CH_2\text{—}CH_2\text{—}C(OEt)_3$ | D-13 |
| $(CH_3)_3Si\text{-}Sp^{11}\text{-}NH\text{—}CH_2\text{—}CH_2\text{—}C(OEt)_2H$ | D-14 |
| $(CH_3)_3Si\text{-}Sp^{11}\text{-}NH\text{—}CH_2\text{—}CH_2\text{—}C(OEt)H_2$ | D-15 |
| $(CH_3)_3Si\text{-}Sp^{11}\text{-}NH\text{—}CH_2\text{—}CH_2\text{—}CH_3$ | D-16 |

Wherein the parameter $Sp^{11}$ has one of the meanings as given under Formula I and preferably denotes a methylene, ethylene straight chain or branched propylene or a straight chain or branched butylene spacer, Me denotes a methyl radical and Et denotes an ethyl radical.

The above described compounds of formula I can be prepared by methods which are known per se and which are described, for example, in standard works of organic chemistry such as, for example, Houben-Weyl, Methoden der organischen Chemie, Thieme-Verlag, Stuttgart.

In a preferred embodiment, the compounds of formula I are prepared from a corresponding amine derivative and a corresponding organo chlorine derivative in a condensation reaction as follows:

$$(R^{11}O)_sSi(CH_3)_{3-s}\text{-}Sp^{11}\text{-}Cl + HNR^{12}\text{-}Sp^{12}\text{-}C(OR^{13})_t H_{3-t} \rightarrow (R^{11}O)_sSi(CH_3)_{3-s}\text{-}Sp^{11}\text{-}NR^{12}\text{-}Sp^{12}\text{-}C(OR^{13})_t H_{3-t}$$

Wherein the parameter $R^{11}$ to $R^{13}$, $Sp^{11}$, $Sp^{12}$, s and t have one of the meanings as given above-under formula I.

It was found that additions of small amounts of the above-described compounds to the polymerisable LC material helped to improve the adhesion of the polymerised LC layer to a substrate, in particular a substrate of TAC, COP or color filter materials, whilst still maintaining the desirable liquid-crystalline properties of the LC material, and whilst exhibiting a uniform homeotropic orientation of the LC molecules in the polymerised film. Thus, the preferred orientation of the of the LC molecules in the polymerised film according to the present invention is homeotropic. Therefore the invention also relates to the use compounds of formula I in a polymerisable LC material as well as to the use compounds of formula I in a polymerisable LC material as adhesion promoters in order to improve the adhesion of the polymerised LC layer to a substrate.

When used, for example, in a liquid crystal display the compounds or adhesion promoters of formula I can improve the adhesion of the polymerised LC films to the other display components, such as, an alignment layer, electrode layer, color filter, planarization layer, polarizer, compensator, passivation layer, insulting layer, black mask, diffusor, reflector, protective layer, or a PSA (pressure sensitive adhesive) layer e.g. in a stack of films. When used for security or decorative applications, the adhesion promoter can improve the adhesion of the polymerised LC films to the surface of e.g. a document of value or the object to be decorated.

Preferably the minimum amount of compound or adhesion promoters of formula I is 0.1%, in particular 0.5%, most preferably 1% by weight of the polymerisable LC material. The maximum amount of compounds or adhesion promoters of formula I is preferably 10%, very preferably 5%, in particular 3% by weight of the polymerisable LC material.

Suitable polymerisable compounds for the polymerisable LC material according to the present invention are preferably selected from mesogenic or liquid-crystalline compounds. Thus, the polymerisable LC material typically comprises one or more polymerisable chiral or achiral mesogenic or liquid-crystalline compounds.

Polymerisable mesogenic mono-, di-, and multireactive compounds used for the present invention can be prepared by methods which are known per se and which are described, for example, in standard works of organic chemistry such as, for example, Houben-Weyl, Methoden der organischen Chemie, Thieme-Verlag, Stuttgart.

Examples of suitable polymerisable mesogenic compounds that can be used as monomers or co-monomers in a polymerisable LC material according to the present invention, are disclosed for example in WO 93/22397, EP 0 261 712, DE 195 04 224, WO 95/22586, WO 97/00600 and GB 2 351 734. The compounds disclosed in these documents, however, are to be regarded merely as examples that shall not limit the scope of this invention.

A suitable polymerisable LC material in accordance with the present invention comprises one or more polymerisable mono-, di-, or multireactive liquid-crystalline compounds, which are preferably selected from the compounds of formula II, $$P\text{-}Sp\text{-}MG\text{-}R^0 \qquad \qquad II$$

wherein

P is a polymerisable group, preferably an acryl, methacryl, vinyl, vinyloxy, propenyl ether, epoxy, oxetane or styrene group, Sp is a spacer group or a single bond, MG is a rod-shaped mesogenic group, which is preferably selected of formula M, M is $-(A^{21}\text{-}Z^{21})_k\text{-}A^{22}\text{-}(Z^{22}\text{-}A^{23})_l\text{-}$, $A^{21}$ to $A^{23}$ are in each occurrence independently of one another an aryl-, heteroaryl-, heterocyclic- or alicyclic group optionally being substituted by one or more identical or different groups L, preferably 1,4-cyclohexylene or 1,4-phenylene, 1,4 pyridine, 1,4-pyrimidine, 2,5-thiophene, 2,6-dithieno[3,2-b:2',3'-d]thiophene, 2,7-fluorine, 2,6-naphtalene, 2,7-phenanthrene optionally being substituted by one or more identical or different groups L, $Z^{21}$ and $Z^{22}$ are in each occurrence independently from each other, —O—, —S—, —CO—, —COO—, —OCO—, —S—CO—, —CO—S—, —O—COO—, —CO—$NR^{01}$—, —$NR^{01}$—CO—, —$NR^{01}$—CO—$NR^{02}$, —$NR^{01}$—CO—O—, —O—CO—$NR^{01}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C≡C—, —CH=CH—COO—, —OCO—CH=CH—, or a single bond, preferably —COO—, —OCO—, —CO—O—, —O—CO—, —OCH$_2$—, —CH$_2$O—, -, —CH$_2$CH$_2$—, —(CH$_2$)$_4$—, —CF$_2$CH$_2$—, —CH$_2$CF$_2$—, —CF$_2$CF$_2$—, —C≡C—, —CH=CH—COO—, —OCO—CH=CH—, or a single bond, L is F, Cl, Br, I, —CN, —NO$_2$, —NCO, —NCS, —OCN, —SCN, —C(=O)NR$^{xx}$R$^{yy}$, —C(=O)OR$^{xx}$, —C(=O)R$^{xx}$, —NR$^{xx}$R$^{yy}$, —OH, —SF$_5$, or straight chain or branched alkyl, alkoxy, alkylcarbonyl, alkoxycarbonyl, alkylcarbonyloxy or alkoxycarbonyloxy with 1 to 12, wherein one or more H atoms are optionally replaced by F or Cl, preferably F, —CN or straight chain or branched alkyl, alkoxy, alkylcarbonyl, alkoxycarbonyl, alkylcarbonyloxy or alkoxycarbonyloxy 1 to 6 C atoms, R$^{xx}$ and R$^{yy}$ independently of each other denote H or alkyl with 1 to 12 C-atoms, R$^0$ is H, alkyl, alkoxy, thioalkyl, alkylcarbonyl, alkoxycarbonyl, alkylcarbonyloxy or alkoxycarbonyloxy with 1 to 20 C atoms more, preferably 1 to 15 C atoms which are optionally fluorinated, or is Y$^0$ or P-Sp-, Y$^0$ is F, Cl, CN, NO$_2$, OCH$_3$, OCN, SCN, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, preferably F, Cl, CN, NO$_2$, OCH$_3$, or mono- oligo- or polyfluorinated alkyl or alkoxy with 1 to 4 C atoms R$^{01}$ and R$^{02}$ each, independently of one another, denote H or alkyl having 1 to 12 C atoms, and Y$^{01}$ and Y$^{02}$ each, independently of one another, denote H, F, Cl or CN, and k and l are each and independently 0, 1, 2, 3 or 4, preferably 0, 1 or 2, most preferably 1.

Above and below, "carbyl group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). "Hydrocarbyl group" denotes a carbyl group, which additionally contains one or more H atoms and optionally one or more heteroatoms, such as, for example, N, O, S, P, Si, Se, As, Te or Ge.

"Halogen" denotes F, Cl, Br or I, preferably F.

A carbyl or hydrocarbyl group can be a saturated or unsaturated group. Unsaturated groups are, for example, aryl, alkenyl, or alkinyl groups. A carbyl or hydrocarbyl group having more than 3 C atoms can be straight chain, branched and/or cyclic and may contain spiro links or condensed rings.

Above and below, the terms "alkyl", "aryl", "heteroaryl", etc., also encompass polyvalent groups, for example alkylene, arylene, heteroarylene, etc. The term "aryl" denotes an aromatic carbon group or a group derived therefrom. The term "heteroaryl" denotes "aryl" in accordance with the above definition containing one or more heteroatoms.

Preferred carbyl and hydrocarbyl groups are optionally substituted alkyl, alkenyl, alkinyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms. Further preferred carbyl and hydrocarbyl groups are C$_1$-C$_{40}$ alkyl, C$_2$-C$_{40}$ alkenyl, C$_2$-C$_{40}$ alkinyl, C$_3$-C$_{40}$ allyl, C$_4$-C$_{40}$ alkyldienyl, C$_4$-C$_{40}$ polyenyl, C$_6$-C$_{40}$ aryl, C$_6$-C$_{40}$ alkylaryl, C$_6$-C$_{40}$ arylalkyl, C$_6$-C$_{40}$ alkylaryloxy, C$_6$-C$_{40}$ aryl-alkyloxy, C$_2$-C$_{40}$ heteroaryl, C$_4$-C$_{40}$ cycloalkyl, C$_4$-C$_{40}$ cycloalkenyl, etc. Particular preference is given to C$_1$-C$_{22}$ alkyl, C$_2$-C$_{22}$ alkenyl, C$_2$-C$_{22}$ alkinyl, C$_3$-C$_{22}$ allyl, C$_4$-C$_{22}$ alkyldienyl, C$_6$-C$_{12}$ aryl, C$_6$-C$_{20}$ arylalkyl, and C$_2$-C$_{20}$ heteroaryl.

Further preferred carbyl and hydrocarbyl groups are straight-chain, branched or cyclic alkyl radicals having 1 to 40, preferably 1 to 25 C atoms, more preferably 1 to 12 C atoms, which are unsubstituted or mono- or polysubstituted by F, Cl, Br, I or CN and in which one or more non-adjacent CH$_2$ groups may each be replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another.

R$^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclo-pentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoro-methyl, perfluoro-n-butyl, 2,2,2-trifluoroethyl, perfluorooctyl, perfluoro-hexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkinyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S, and Se.

Particular preference is given to mono-, bi-, or tricyclic aryl groups having 6 to 25 C atoms and mono-, bi- or tricyclic heteroaryl groups having 2 to 25 C atoms, which optionally contain fused rings and which are optionally substituted. Preference is furthermore given to 5-, 6-, or 7-membered aryl and heteroaryl groups, in which, in addition, one or more CH groups may be replaced by N, S, or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S, and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi-, or tricyclic groups having 3 to 25 C atoms, which optionally contain fused rings and which are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent CH$_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, carbyl, and hydrocarbyl radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, —OH, —CN, —NO$_2$, —NCO, —NCS, —OCN, —SCN, —C(=O)N(R$^x$)$_2$, —C(=O)Y$^1$, —C(=O)R$^x$, —C(=O)OR$^x$, —N(R$^x$)$_2$, in which R$^x$ has the above-mentioned meaning, and Y$^1$ denotes halogen, optionally substituted silyl, optionally substituted aryl or heteroaryl having 4 to 40, preferably 4 to 20 ring atoms, and straight-chain or branched alkyl, alkenyl, alkinyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, R⁰, —OR⁰, —CO—R⁰, —CO—O—R⁰, —O—CO—R⁰ or —O—CO—O—R⁰, in which R⁰ has the above-mentioned meaning.

Particularly preferred substituents L are, for example, F, Cl, CN, NO₂, CH₃, C₂H₅, OCH₃, OC₂H₅, COCH₃, COC₂H₅, COOCH₃, COOC₂H₅, CF₃, OCF₃, OCHF₂, OC₂F₅, furthermore phenyl.

In the formula shown above and below, a substituted phenylene ring

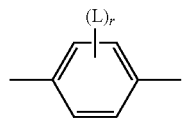

is preferably

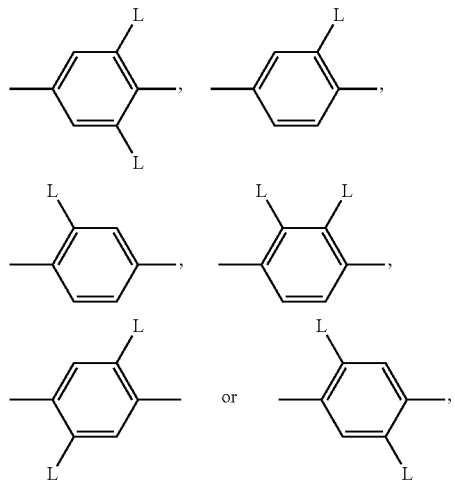

in which L has, on each occurrence identically or differently, one of the meanings given above and below, and is preferably F, Cl, CN, NO₂, CH₃, C₂H₅, C(CH₃)₃, CH(CH₃)₂, CH₂CH(CH₃)C₂H₅, OCH₃, OC₂H₅, COCH₃, COC₂H₅, COOCH₃, COOC₂H₅, CF₃, OCF₃, OCHF₂, OC₂F₅ or P-Sp-, very preferably F, Cl, CN, CH₃, C₂H₅, OCH₃, COCH₃, OCF₃ or P-Sp-, most preferably F, Cl, CH₃, OCH₃, COCH₃ or OCF₃.

The polymerisable group P is preferably selected from groups containing a C═C double bond or C≡C triple bond, and groups which are suitable for polymerisation with ring opening, such as, for example, oxetane or epoxide groups.

Very preferably the polymerisable group P is selected from the group consisting of CH₂═CW¹—COO—, CH₂═CW¹—CO—,

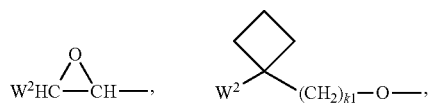

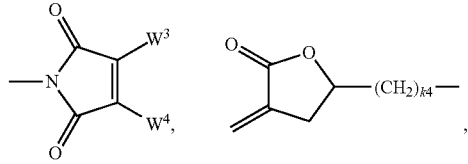

CH₂═CW²—(O)_{k3}—, CW¹═CH—CO—(O)_{k3}—, CW¹═CH—CO—NH—, CH₂═CW¹—CO—NH—, CH₃—CH═CH—O—, (CH₂═CH)₂CH—OCO—, (CH₂═CH—CH₂)₂CH—OCO—, (CH₂═CH)₂CH—O—, (CH₂═CH—CH₂)₂N—, (CH₂═CH—CH₂)₂N—CO—, CH₂═CW¹—CO—NH—, CH₂═CH—(COO)_{k1}-Phe-(O)_{k2}—, CH₂═CH—(CO)_{k1}-Phe-(O)_{k2}—, Phe-CH═CH—, in which W¹ denotes H, F, Cl, CN, CF₃, phenyl or alkyl having 1 to 5 C atoms, in particular H, F, Cl or CH₃, W² denotes H or alkyl having 1 to 5 C atoms, in particular H, methyl, ethyl or n-propyl, W³ and W⁴ each, independently of one another, denote H, Cl or alkyl having 1 to 5 C atoms, Phe denotes 1,4-phenylene, which is optionally substituted by one or more radicals L as being defined above but being different from P-Sp, and k₁, k₂ and k₃ each, independently of one another, denote 0 or 1, k₃ preferably denotes 1, and k₄ is an integer from 1 to 10.

Particularly preferred groups P are CH₂═CH—COO—, CH₂═C(CH₃)—COO—, CH₂═CF—COO—, CH₂═CH—, CH₂═CH—O—, (CH₂═CH)₂CH—OCO—, (CH₂═CH)₂CH—O—,

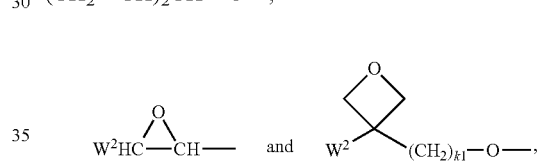

in particular vinyloxy, acrylate, methacrylate, fluoroacrylate, chloroacrylate, oxetane and epoxide, most preferably acrylate or methacrylate.

In a further preferred embodiment of the invention, all polymerisable compounds and sub-formulae thereof contain instead of one or more radicals P-Sp-, one or more branched radicals containing two or more polymerisable groups P (multireactive polymerisable radicals). Suitable radicals of this type, and polymerisable compounds containing them, are described, for example, in U.S. Pat. No. 7,060,200 B1 or US 2006/0172090 A1. Particular preference is given to multireactive polymerisable radicals selected from the following formulae:

| | |
|---|---|
| —X-alkyl-CHP¹—CH₂—CH₂P² | I*a |
| —X-alkyl-C(CH₂P¹)(CH₂P²)—CH₂P³ | I*b |
| —X-alkyl-CHP¹CHP²—CH₂P³ | I*c |
| —X-alkyl-C(CH₂P¹)(CH₂P²)—C_{aa}H_{2aa+1} | I*d |
| —X-alkyl-CHP¹—CH₂P² | I*e |
| —X-alkyl-CHP¹P² | I*f |
| —X-alkyl-CP¹P²—C_{aa}H_{2aa+1} | I*g |
| —X-alkyl-C(CH₂P¹)(CH₂P²)—CH₂OCH₂—C(CH₂P³)(CH₂P⁴)CH₂P⁵ | I*h |
| —X-alkyl-CH((CH₂)_{aa}P¹)((CH₂)_{bb}P²) | I*i |
| —X-alkyl-CHP¹CHP²—C_{aa}H_{2aa+1} | I*k | in which alkyl denotes a single bond or straight-chain or branched alkylene having 1 to 12 C atoms, in which one or more non-adjacent CH$_2$ groups may each be replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where R$^x$ has the above-mentioned meaning and preferably denotes R$^0$ as defined above, aa and bb each, independently of one another, denote 0, 1, 2, 3, 4, 5 or 6, X has one of the meanings indicated for X', and P$^{1-5}$ each, independently of one another, have one of the meanings indicated above for P.

Preferred spacer groups Sp are selected from the formula Sp'-X', so that the radical "P-Sp-" conforms to the formula "P-Sp'-X'-", where Sp' denotes alkylene having 1 to 20, preferably 1 to 12 C atoms, which is optionally mono- or polysubstituted by F, Cl, Br, I or CN and in which, in addition, one or more non-adjacent CH$_2$ groups may each be replaced, independently of one another, by —O—, —S—, —NH—, —NR$^{01}$—, —SiR$^{01}$R$^{02}$—, —CO—, —COO—, —OCO—, —OCO—O—, —S—CO—, —CO—S—, —NR$^{01}$—CO—O—, —O—CO—NR$^{01}$—, —NR$^{01}$—CO—NR$^{01}$—, —CH=CH— or —C≡C— in such a way that O and/or S atoms are not linked directly to one another, X' denotes —O—, —S—, —CO—, —COO—, —OCO—, —O—COO—, —CO—NR$^{01}$—, —NR$^{01}$—CO—, —NR$^{01}$—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C≡C—, —CH=CH—COO—, —OCO—CH=CH— or a single bond, R$^{01}$ and R$^{02}$ each, independently of one another, denote H or alkyl having 1 to 12 C atoms, and Y$^{01}$ and Y$^{02}$ each, independently of one another, denote H, F, Cl or CN.

X' is preferably —O—, —S—CO—, —COO—, —OCO—, —O—COO—, —CO—NR$^0$—, —NR$^{01}$—CO—, —NR$^{01}$—CO—NR$^{01}$— or a single bond.

Typical spacer groups Sp' are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{01}$R$^{02}$—O)$_{p1}$—, in which p1 is an integer from 1 to 12, q1 is an integer from 1 to 3, and R$^{01}$ and R$^{02}$ have the above-mentioned meanings.

Particularly preferred groups —X'-Sp'- are —(CH$_2$)$_{p1}$—, —O—(CH$_2$)$_{p1}$—, —OCO—(CH$_2$)$_{p1}$—, —OCOO—(CH$_2$)$_{p1}$—.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

Preferred polymerisable mono-, di-, or multireactive liquid-crystalline compounds are disclosed for example in WO 93/22397, EP 0 261 712, DE 195 04 224, WO 95/22586, WO 97/00600, U.S. Pat. Nos. 5,518,652, 5,750,051, 5,770,107 and 6,514,578.

Further preferred polymerisable mono-, di-, or multireactive liquid-crystalline compounds are shown in the following list:

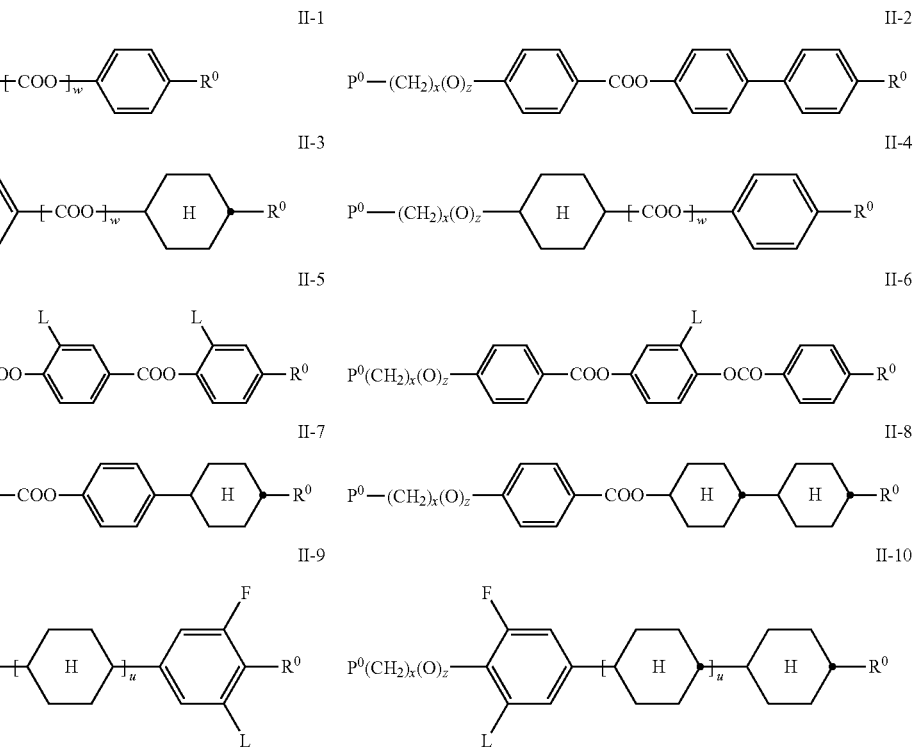

-continued
II-11
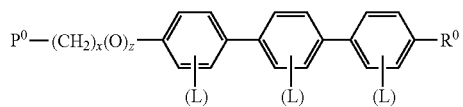
II-12
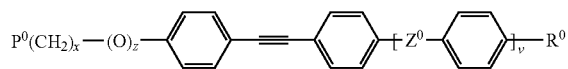
II-13
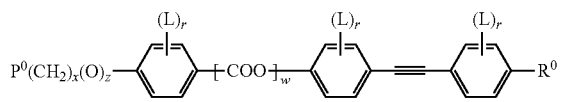
II-14
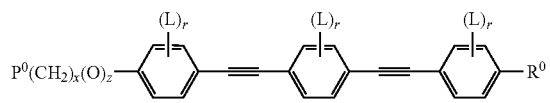
II-15
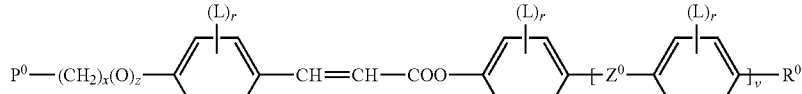
II-16
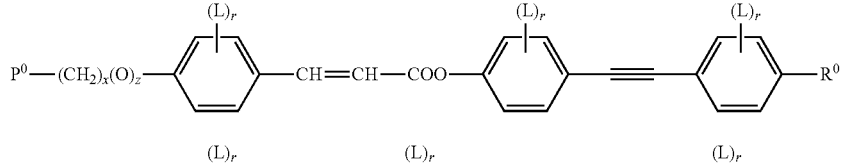
II-17
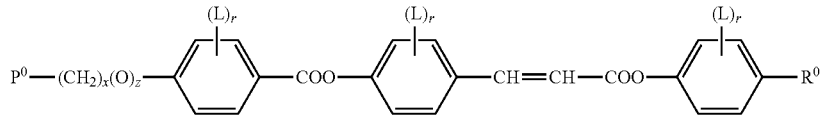
II-18
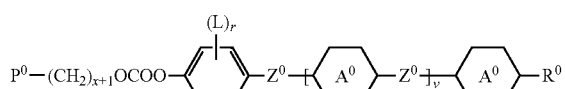
II-19
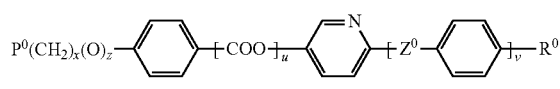
II-20
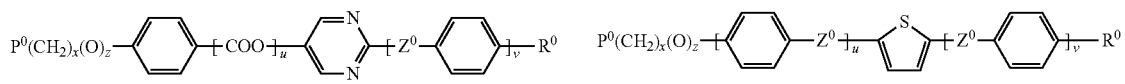
II-21
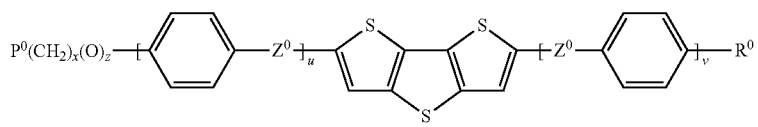
II-22
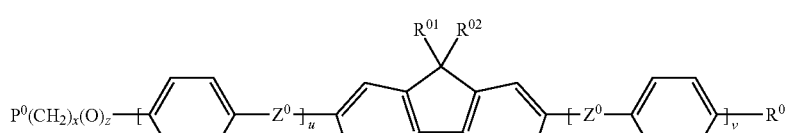
II-23
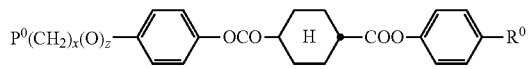
II-25
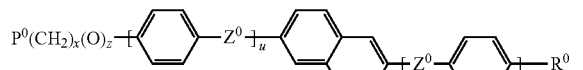
II-24
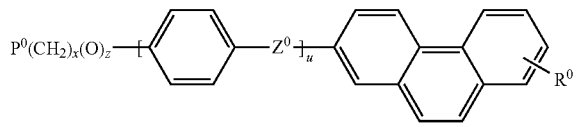
II-26
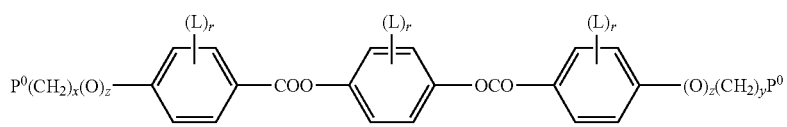
II-27

-continued

II-28
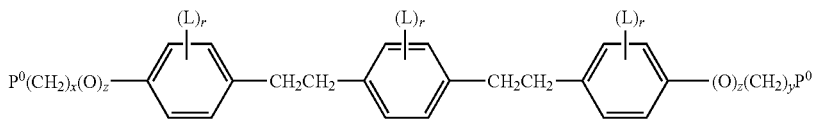

II-29
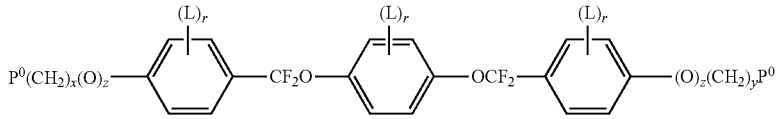

II-30
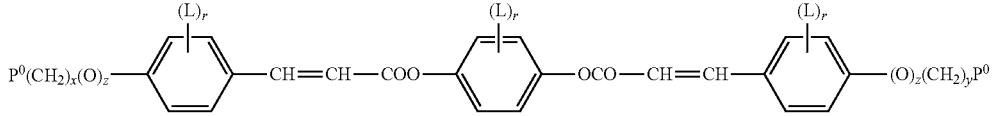

II-31
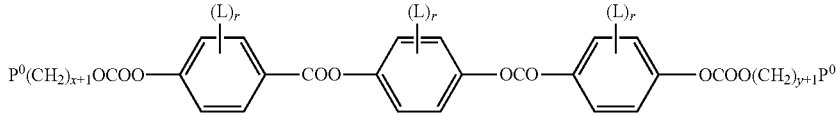

II-32
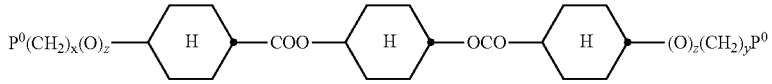

II-33
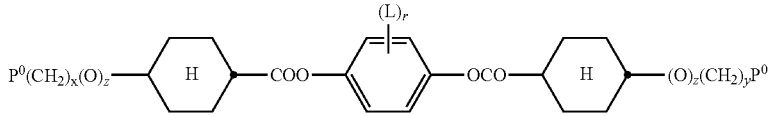

II-34
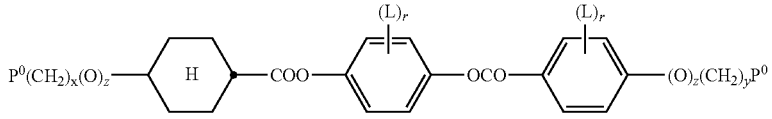

wherein
$P^0$ is, in case of multiple occurrence independently of one another, a polymerisable group, preferably an acryl, methacryl, oxetane, epoxy, vinyl, vinyloxy, propenyl ether or styrene group,
$A^0$ is, in case of multiple occurrence independently of one another, 1,4-phenylene that is optionally substituted with 1, 2, 3 or 4 groups L, or trans-1,4-cyclohexylene,
$Z^0$ is, in case of multiple occurrence independently of one another, —COO—, —OCO—, —CH$_2$CH$_2$—, —C≡C—, —CH=CH—, —CH=CH—COO—, —OCO—CH=CH— or a single bond,
r is 0, 1, 2, 3 or 4, preferably 0, 1 or 2,
t is, in case of multiple occurrence independently of one another, 0, 1, 2 or 3,
u and v are independently of each other 0, 1 or 2,
w is 0 or 1,
x and y are independently of each other 0 or identical or different integers from 1 to 12,
z is 0 or 1, with z being 0 if the adjacent x or y is 0,
in addition, wherein the benzene and naphthalene rings can additionally be substituted with one or more identical or different groups L. The parameter $R^0$, $Y^0$, $R^{O1}$, $R^{O2}$ and L have the same meanings as given above in formula II.

The proportion of said mono-, di- or multireactive liquid-crystalline compounds in a preferred LC material used for the method according to the present invention as a whole, is preferably in the range from 30 to 99.9% by weight, more preferably in the range from 40 to 99.9% by weight and even more preferably in the range from 50 to 99.9% by weight.

The polymerisable LC material is preferably a mixture comprising one or more polymerisable compounds having one polymerisable group (monoreactive) and one or more polymerisable compound having two or more polymerisable groups (di- or multireactive).

In another preferred embodiment the polymerisable LC material used for the preparation of the low crosslinked film does not contain compounds having more than two polymerisable groups.

In another preferred embodiment the polymerisable LC material used for the preparation of the low cross-linked film is an achiral material, i.e. it does not contain chiral compounds.

The polymerisable compounds and polymerisable mesogenic compounds referred to above and below are preferably monomers.

Another object of the invention is an RM formulation comprising one or more compounds of formula I, or comprising an RM mixture, as described above and below, and further comprising one or more solvents and/or further additives.

In a preferred embodiment the RM formulation comprises optionally one or more additives selected from the group consisting of polymerisation initiators, surfactants, stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and nanoparticles.

In another preferred embodiment, the RM formulation optionally comprises one or more additives selected from polymerisable non-mesogenic compounds (reactive thinners). The amount of these additives in the RM formulation is preferably from 0 to 30%, very preferably from 0 to 25%.

The reactive thinners used are not only substances which are referred to in the actual sense as reactive thinners, but also auxiliary compounds already mentioned above which contain one or more complementary reactive units, for example hydroxyl, thiol-, or amino groups, via which a reaction with the polymerisable units of the liquid-crystalline compounds can take place.

The substances, which are usually capable of photopolymerization, include, for example, mono-, bi- and polyfunctional compounds containing at least one olefinic double bond. Examples thereof are vinyl esters of carboxylic acids, for example of lauric, myristic, palmitic and stearic acid, and of dicarboxylic acids, for example of succinic acid, adipic acid, allyl and vinyl ethers and methacrylic and acrylic esters of monofunctional alcohols, for example of lauryl, myristyl, palmityl and stearyl alcohol, and diallyl and divinyl ethers of bifunctional alcohols, for example ethylene glycol and 1,4-butanediol.

Also suitable are, for example, methacrylic and acrylic esters of polyfunctional alcohols, in particular those, which contain no further functional groups, or at most ether groups, besides the hydroxyl groups. Examples of such alcohols are bifunctional alcohols, such as ethylene glycol, propylene glycol and their more highly condensed representatives, for example diethylene glycol, triethylene glycol, dipropylene glycol, tripropylene glycol etc., butanediol, pentanediol, hexanediol, neopentyl glycol, alkoxylated phenolic compounds, such as ethoxylated and propoxylated bisphenols, cyclohexanedimethanol, trifunctional and polyfunctional alcohols, such as glycerol, trimethylolpropane, butanetriol, trimethylolethane, pentaerythritol, ditrimethylolpropane, dipentaerythritol, sorbitol, mannitol, and the corresponding alkoxylated, in particular ethoxylated and propoxylated alcohols.

Other suitable reactive thinners are polyester (meth)acrylates, which are the (meth)acrylic ester of polyesterols.

Examples of suitable polyesterols are those, which can be prepared by esterification of polycarboxylic acids, preferably dicarboxylic acids, using polyols, preferably diols. The starting materials for such hydroxyl-containing polyesters are known to the person skilled in the art. Dicarboxylic acids which can be employed are succinic, glutaric acid, adipic acid, sebacic acid, o-phthalic acid and isomers and hydrogenation products thereof, and esterifiable and transesterifiable derivatives of said acids, for example anhydrides and dialkyl esters. Suitable polyols are the abovementioned alcohols, preferably ethyleneglycol, 1,2- and 1,3-propylene glycol, 1,4-butanediol, 1,6-hexanediol, neopentyl glycol, cyclohexanedimethanol and polyglycols of the ethylene glycol and propylene glycol type.

Suitable reactive thinners are furthermore 1,4-divinylbenzene, triallyl cyanurate, acrylic esters of tricyclodecenyl alcohol of the following formula

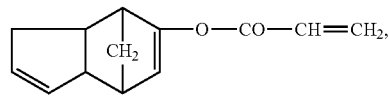 [SMILES: C=CC(=O)OC1=CC2CC1C1CC=CC21]

also known under the name dihydrodicyclopentadienyl acrylate, and the allyl esters of acrylic acid, methacrylic acid and cyanoacrylic acid.

Of the reactive thinners, which are mentioned by way of example, those containing photopolymerizable groups are used in particular and in view of the abovementioned preferred compositions.

This group includes, for example, dihydric and polyhydric alcohols, for example ethylene glycol, propylene glycol and more highly condensed representatives thereof, for example diethylene glycol, triethylene glycol, dipropylene glycol, tripropylene glycol etc., butanediol, pentanediol, hexanediol, neopentyl glycol, cyclohexanedimethanol, glycerol, trimethylolpropane, butanetriol, trimethylolethane, pentaerythritol, ditrimethylolpropane, dipentaerythritol, sorbitol, mannitol and the corresponding alkoxylated, in particular ethoxylated and propoxylated alcohols.

The group furthermore also includes, for example, alkoxylated phenolic compounds, for example ethoxylated and propoxylated bisphenols.

These reactive thinners may furthermore be, for example, epoxide or urethane (meth)acrylates.

Epoxide (meth)acrylates are, for example, those as obtainable by the reaction, known to the person skilled in the art, of epoxidized olefins or poly- or diglycidyl ether, such as bisphenol A diglycidyl ether, with (meth)acrylic acid.

Urethane (meth)acrylates are, in particular, the products of a reaction, likewise known to the person skilled in the art, of hydroxylalkyl (meth)acrylates with poly- or diisocyanates.

Such epoxide and urethane (meth)acrylates are included amongst the compounds listed above as "mixed forms".

If reactive thinners are used, their amount and properties must be matched to the respective conditions in such a way that, on the one hand, a satisfactory desired effect, for example the desired colour of the composition according to the invention, is achieved, but, on the other hand, the phase behaviour of the liquid-crystalline composition is not excessively impaired. The low-crosslinking (high-crosslinking) liquid-crystalline compositions can be prepared, for example, using corresponding reactive thinners, which have a relatively low (high) number of reactive units per molecule.

The group of diluents include, for example:

C1-C4-alcohols, for example methanol, ethanol, n-propanol, isopropanol, butanol, isobutanol, sec-butanol and, in particular, the C5-C12-alcohols n-pentanol, n-hexanol, n-heptanol, n-octanol, n-nonanol, n-decanol, n-undecanol and n-dodecanol, and isomers thereof, glycols, for example 1,2-ethylene glycol, 1,2- and 1,3-propylene glycol, 1,2-, 2,3- and 1,4-butylene glycol, di- and triethylene glycol and di- and tripropylene glycol, ethers, for example methyl tert-butyl ether, 1,2-ethylene glycol mono- and dimethyl ether, 1,2-ethylene glycol mono- and -diethylether, 3-methoxypropanol, 3-isopropoxypropanol, tetrahydrofuran and dioxane, ketones, for example acetone, methyl ethyl ketone, methyl isobutyl ketone and diacetone alcohol (4-hydroxy-4-methyl-2-pentanone), C1-C5-alkyl esters, for example methyl acetate, ethyl acetate, propyl acetate, butyl acetate and amyl acetate, aliphatic and aromatic hydrocarbons, for example pentane, hexane, heptane, octane, isooctane, petroleum ether, toluene, xylene, ethylbenzene, tetralin, decalin, dimethylnaphthalene, white spirit, Shellsol® and Solvesso® mineral oils, for example gasoline, kerosine, diesel oil and heating oil, but also natural oils, for example olive oil, soya oil, rapeseed oil, linseed oil and sunflower oil.

It is of course also possible to use mixtures of these diluents in the compositions according to the invention.

So long as there is at least partial miscibility, these diluents can also be mixed with water. Examples of suitable diluents here are C1-C4-alcohols, for example methanol, ethanol, n-propanol, isopropanol, butanol, isobutanol and sec-butanol, glycols, for example 1,2-ethylene glycol, 1,2- and 1,3-propylene glycol, 1,2-, 2,3- and 1,4-butylene glycol, di- and triethylene glycol, and di- and tripropylene glycol, ethers, for example tetrahydrofuran and dioxane, ketones, for example acetone, methyl ethyl ketone and diacetone alcohol (4-hydroxy-4-methyl-2-pentanone), and C1-C4-alkyl esters, for example methyl, ethyl, propyl and butyl acetate.

The diluents are optionally employed in a proportion of from about 0 to 10.0% by weight, preferably from about 0 to 5.0% by weight, based on the total weight of the RM formulation.

The antifoams and deaerators (c1)), lubricants and flow auxiliaries (c2)), thermally curing or radiation-curing auxiliaries (c3)), substrate wetting auxiliaries (c4)), wetting and dispersion auxiliaries (c5)), hydrophobicizing agents (c6)), adhesion promoters (c7)) and auxiliaries for promoting scratch resistance (c8)) cannot strictly be delimited from one another in their action.

For example, lubricants and flow auxiliaries often also act as antifoams and/or deaerators and/or as auxiliaries for improving scratch resistance. Radiation-curing auxiliaries can also act as lubricants and flow auxiliaries and/or deaerators and/or as substrate wetting auxiliaries. In individual cases, some of these auxiliaries can also fulfil the function of an adhesion promoter (c8)).

Corresponding to the above-said, a certain additive can therefore be classified in a number of the groups c1) to c8) described below.

The antifoams in group c1) include silicon-free and silicon-containing polymers. The silicon-containing polymers are, for example, unmodified or modified polydialkylsiloxanes or branched copolymers, comb or block copolymers comprising polydialkylsiloxane and polyether units, the latter being obtainable from ethylene oxide or propylene oxide.

The deaerators in group c1) include, for example, organic polymers, for example polyethers and polyacrylates, dialkylpolysiloxanes, in particular dimethylpolysiloxanes, organically modified polysiloxanes, for example arylalkyl-modified polysiloxanes, and fluorosilicones.

The action of the antifoams is essentially based on preventing foam formation or destroying foam that has already formed. Antifoams essentially work by promoting coalescence of finely divided gas or air bubbles to give larger bubbles in the medium to be deaerated, for example the compositions according to the invention, and thus accelerate escape of the gas (of the air). Since antifoams can frequently also be employed as deaerators and vice versa, these additives have been included together under group c1).

Such auxiliaries are, for example, commercially available from Tego as TEGO® Foamex 800, TEGO® Foamex 805, TEGO® Foamex 810, TEGO® Foamex 815, TEGO® Foamex 825, TEGO® Foamex 835, TEGO® Foamex 840, TEGO® Foamex 842, TEGO® Foamex 1435, TEGO® Foamex 1488, TEGO® Foamex 1495, TEGO® Foamex 3062, TEGO® Foamex 7447, TEGO® Foamex 8020, Tego® Foamex N, TEGO® Foamex K 3, TEGO® Antifoam 2-18, TEGO® Antifoam 2-18, TEGO® Antifoam 2-57, TEGO® Antifoam 2-80, TEGO® Antifoam 2-82, TEGO® Antifoam 2-89, TEGO® Antifoam 2-92, TEGO® Antifoam 14, TEGO® Antifoam 28, TEGO® Antifoam 81, TEGO® Antifoam D 90, TEGO® Antifoam 93, TEGO® Antifoam 200, TEGO® Antifoam 201, TEGO® Antifoam 202, TEGO® Antifoam 793, TEGO® Antifoam 1488, TEGO® Antifoam 3062, TEGOPREN® 5803, TEGOPREN® 5852, TEGOPREN® 5863, TEGOPREN® 7008, TEGO® Antifoam 1-60, TEGO® Antifoam 1-62, TEGO® Antifoam 1-85, TEGO® Antifoam 2-67, TEGO® Antifoam WM 20, TEGO® Antifoam 50, TEGO® Antifoam 105, TEGO® Antifoam 730, TEGO® Antifoam MR 1015, TEGO® Antifoam MR 1016, TEGO® Antifoam 1435, TEGO® Antifoam N, TEGO® Antifoam KS 6, TEGO® Antifoam KS 10, TEGO® Antifoam KS 53, TEGO® Antifoam KS 95, TEGO® Antifoam KS 100, TEGO® Antifoam KE 600, TEGO® Antifoam KS 911, TEGO® Antifoam MR 1000, TEGO® Antifoam KS 1100, Tego® Airex 900, Tego® Airex 910, Tego® Airex 931, Tego® Airex 935, Tego® Airex 936, Tego® Airex 960, Tego® Airex 970, Tego® Airex 980 and Tego® Airex 985 and from BYK as BYK®-011, BYK®-019, BYK®-020, BYK®-021, BYK®-022, BYK®-023, BYK®-024, BYK®-025, BYK®-027, BYK®-031, BYK®-032, BYK®-033, BYK®-034, BYK®-035, BYK®-036, BYK®-037, BYK®-045, BYK®-051, BYK®-052, BYK®-053, BYK®-055, BYK®-057, BYK®-065, BYK®-066, BYK®-070, BYK®-080, BYK®-088, BYK®-141 and BYK®-A 530.

The auxiliaries in group c1) are optionally employed in a proportion of from about 0 to 3.0% by weight, preferably from about 0 to 2.0% by weight, based on the total weight of the RM formulation.

In group c2), the lubricants and flow auxiliaries typically include silicon-free, but also silicon-containing polymers, for example polyacrylates or modifiers, low-molecular-weight polydialkylsiloxanes. The modification consists in some of the alkyl groups having been replaced by a wide variety of organic radicals. These organic radicals are, for example, polyethers, polyesters or even long-chain alkyl radicals, the former being used the most frequently.

The polyether radicals in the correspondingly modified polysiloxanes are usually built up from ethylene oxide and/or propylene oxide units. Generally, the higher the proportion of these alkylene oxide units in the modified polysiloxane, the more hydrophilic is the resultant product.

Such auxiliaries are, for example, commercially available from Tego as TEGO® Glide 100, TEGO® Glide ZG 400, TEGO® Glide 406, TEGO® Glide 410, TEGO® Glide 411, TEGO® Glide 415, TEGO® Glide 420, TEGO® Glide 435, TEGO® Glide 440, TEGO® Glide 450, TEGO® Glide A 115, TEGO® Glide B 1484 (can also be used as antifoam and deaerator), TEGO® Flow ATF, TEGO® Flow 300, TEGO® Flow 460, TEGO® Flow 425 and TEGO® Flow ZFS 460. Suitable radiation-curable lubricants and flow auxiliaries, which can also be used to improve the scratch resistance, are the products TEGO® Rad 2100, TEGO® Rad 2200, TEGO® Rad 2500, TEGO® Rad 2600 and TEGO® Rad 2700, which are likewise obtainable from TEGO.

Such-auxiliaries are also available, for example, from BYK as BYK®-300 BYK®-306, BYK®-307, BYK®-310, BYK®-320, BYK®-333, BYK®-341, Byk® 354, Byk®361, Byk®361 N, BYK®388.

Such-auxiliaries are also available, for example, from Merck KGaA as Tivida® FL 2300 and Tivida® FL 2500

The auxiliaries in group c2) are optionally employed in a proportion of from about 0 to 3.0% by weight, preferably from about 0 to 2.0% by weight, based on the total weight of the RM formulation.

In group c3), the radiation-curing auxiliaries include, in particular, polysiloxanes having terminal double bonds which are, for example, a constituent of an acrylate group. Such auxiliaries can be crosslinked by actinic or, for example, electron radiation. These auxiliaries generally combine a number of properties together. In the uncrosslinked state, they can act as antifoams, deaerators, lubricants and flow auxiliaries and/or substrate wetting auxiliaries, while, in the crosslinked state, they increase, in particular, the scratch resistance, for example of coatings or films which can be produced using the compositions according to the invention. The improvement in the gloss properties, for example of precisely those coatings or films, is regarded essentially as a consequence of the action of these auxiliaries as antifoams, deaerators and/or lubricants and flow auxiliaries (in the uncrosslinked state).

Examples of suitable radiation-curing auxiliaries are the products TEGO® Rad 2100, TEGO® Rad 2200, TEGO® Rad 2500, TEGO® Rad 2600 and TEGO® Rad 2700 available from TEGO and the product BYK®-371 available from BYK.

Thermally curing auxiliaries in group c3) contain, for example, primary OH groups which are able to react with isocyanate groups, for example of the binder.

Examples of thermally curing auxiliaries, which can be used, are the products BYK®-370, BYK®-373 and BYK®-375 available from BYK.

The auxiliaries in group c3) are optionally employed in a proportion of from about 0 to 5.0% by weight, preferably from about 0 to 3.0% by weight, based on the total weight of the RM formulation.

The substrate wetting auxiliaries in group c4) serve, in particular, to increase the wettability of the substrate to be printed or coated, for example, by printing inks or coating compositions, for example compositions according to the invention. The generally attendant improvement in the lubricant and flow behaviour of such printing inks or coating compositions has an effect on the appearance of the finished (for example crosslinked) print or coating.

A wide variety of such auxiliaries are commercially available, for example from Tego as TEGO® Wet KL 245, TEGO® Wet 250, TEGO® Wet 260 and TEGO® Wet ZFS 453 and from BYK as BYK®-306, BYK®-307, BYK®-310, BYK®-333, BYK®-344, BYK®-345, BYK®-346 and Byk®-348.

The auxiliaries in group c4) are optionally employed in a proportion of from about 0 to 3.0% by weight, preferably from about 0 to 1.5% by weight, based on the total weight of the liquid-crystalline composition.

The wetting and dispersion auxiliaries in group c5) serve, in particular, to prevent the flooding and floating and the sedimentation of pigments and are therefore, if necessary, suitable in particular in pigmented compositions.

These auxiliaries stabilize pigment dispersions essentially through electrostatic repulsion and/or steric hindrance of the pigment particles containing these additives, where, in the latter case, the interaction of the auxiliary with the ambient medium (for example binder) plays a major role.

Since the use of such wetting and dispersion auxiliaries is common practice, for example in the technical area of printing inks and paints, the selection of a suitable auxiliary of this type generally does not present the person skilled in the art with any difficulties, if they are used.

Such wetting and dispersion auxiliaries are commercially available, for example from Tego, as TEGO® Dispers 610, TEGO® Dispers 610 S, TEGO® Dispers 630, TEGO® Dispers 700, TEGO® Dispers 705, TEGO® Dispers 710, TEGO® Dispers 720 W, TEGO® Dispers 725 W, TEGO® Dispers 730 W, TEGO® Dispers 735 W and TEGO® Dispers 740 W and from BYK as Disperbyk®, Disperbyk®-107, Disperbyk®-108, Disperbyk®-110, Disperbyk®-111, Disperbyk®-115, Disperbyk®-130, Disperbyk®-160, Disperbyk®-161, Disperbyk®-162, Disperbyk®-163, Disperbyk®-164, Disperbyk®-165, Disperbyk®-166, Disperbyk®-167, Disperbyk®-170, Disperbyk®-174, Disperbyk®-180, Disperbyk®-181, Disperbyk®-182, Disperbyk®-183, Disperbyk®-184, Disperbyk®-185, Disperbyk®-190, Anti-Terra®-U, Anti-Terra®-U 80, Anti-Terra®-P, Anti-Terra®-203, Anti-Terra®-204, Anti-Terra®-206, BYK®-151, BYK®-154, BYK®-155, BYK®-P 104 S, BYK®-P 105, Lactimon®, Lactimon®-WS and Bykumen®.

The amount of the auxiliaries in group c5) used on the mean molecular weight of the auxiliary. In any case, a preliminary experiment is therefore advisable, but this can be accomplished simply by the person skilled in the art.

The hydrophobicizing agents in group c6) can be used to give water-repellent properties to prints or coatings produced, for example, using compositions according to the invention. This prevents or at least greatly suppresses swelling due to water absorption and thus a change in, for example, the optical properties of such prints or coatings. In addition, when the composition is used, for example, as a printing ink in offset printing, water absorption can thereby be prevented or at least greatly reduced.

Such hydrophobicizing agents are commercially available, for example, from Tego as Tego® Phobe WF, Tego® Phobe 1000, Tego® Phobe 1000 S, Tego® Phobe 1010, Tego® Phobe 1030, Tego® Phobe 1010, Tego® Phobe 1010, Tego® Phobe 1030, Tego® Phobe 1040, Tego® Phobe 1050, Tego® Phobe 1200, Tego® Phobe 1300, Tego® Phobe 1310 and Tego® Phobe 1400.

The auxiliaries in group c6) are optionally employed in a proportion of from about 0 to 5.0% by weight, preferably from about 0 to 3.0% by weight, based on the total weight of the RM formulation.

Further adhesion promoters from group c7) serve to improve the adhesion of two interfaces in contact. It is directly evident from this that essentially the only fraction of the adhesion promoter that is effective is that located at one or the other or at both interfaces. If, for example, it is desired to apply liquid or pasty printing inks, coating compositions or paints to a solid substrate, this generally means that the adhesion promoter must be added directly to the latter or the substrate must be pre-treated with the adhesion promoters (also known as priming), i.e. this substrate is given modified chemical and/or physical surface properties.

If the substrate has previously been primed with a primer, this means that the interfaces in contact are that of the primer on the one hand and of the printing ink or coating composition or paint on the other hand. In this case, not only the adhesion properties between the substrate and the primer, but also between the substrate and the printing ink or coating composition or paint play a part in adhesion of the overall multilayer structure on the substrate.

Adhesion promoters in the broader sense which may be mentioned are also the substrate wetting auxiliaries already listed under group c4), but these generally do not have the same adhesion promotion capacity.

In view of the widely varying physical and chemical natures of substrates and of printing inks, coating compositions and paints intended, for example, for their printing or coating, the multiplicity of adhesion promoter systems is not surprising.

Adhesion promoters based on silanes are, for example, 3-aminopropyltrimethoxysilane, 3-aminopropyltriethoxysilane, 3-aminopropylmethyldiethoxysilane, N-aminoethyl-3-aminopropyltrimethoxysilane, N-aminoethyl-3-aminopropylmethyldimethoxysilane, N-methyl-3-aminopropyltrimethoxysilane, 3-ureidopropyltriethoxysilane, 3-methacryloyloxypropyltrimethoxysilane, 3-glycidyloxypropyltrimethoxysilane, 3-mercaptopropyltrimethoxysilane, 3-chloropropyltrimethoxysilane and vinyltrimethoxysilane. These and other silanes are commercially available from Hüls, for example under the tradename DYNASILAN®.

Corresponding technical information from the manufacturers of such additives should generally be used or the person skilled in the art can obtain this information in a simple manner through corresponding preliminary experiments.

However, if these additives are to be added as auxiliaries from group c7) to the RM formulations according to the invention, their proportion optionally corresponds to from about 0 to 5.0% by weight, based on the total weight of the RM formulation. These concentration data serve merely as guidance, since the amount and identity of the additive are determined in each individual case by the nature of the substrate and of the printing/coating composition. Corresponding technical information is usually available from the manufacturers of such additives for this case or can be determined in a simple manner by the person skilled in the art through corresponding preliminary experiments.

The auxiliaries for improving the scratch resistance in group c8) include, for example, the abovementioned products TEGO® Rad 2100, TEGO® Rad 2200, TEGO® Rad 2500, TEGO® Rad 2600 and TEGO® Rad 2700, which are available from Tego.

For these auxiliaries, the amount data given for group c3) are likewise suitable, i.e. these additives are optionally employed in a proportion of from about 0 to 5.0% by weight, preferably from about 0 to 3.0% by weight, based on the total weight of the liquid-crystalline composition.

Examples, which may be mentioned, of light, heat and/or oxidation stabilizers are the following:

alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which have a linear or branched side chain, for example 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures of these compounds, alkylthiomethylphenols, such as 2,4-dioctylthiomethyl-6-tert-butylphenol, 2,4-dioctylthiomethyl-6-methylphenol, 2,4-dioctylthiomethyl-6-ethylphenol and 2,6-didodecylthiomethyl-4-nonylphenol, Hydroquinones and alkylated hydroquinones, such as 2,6-di-tert-butyl-4-methoxyphenol, 2,5-di-tert-butylhydroquinone, 2,5-di-tert-amylhydrocrainone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate and bis(3,5-di-tert-butyl-4-hydroxyphenyl)adipate, Tocopherols, such as $\alpha$-tocopherol, $\beta$-tocopherol, $\gamma$-tocopherol, $\delta$-tocopherol and mixtures of these compounds, and tocopherol derivatives, such as tocopheryl acetate, succinate, nicotinate and polyoxyethylenesuccinate ("tocofersolate"), hydroxylated diphenyl thioethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol) and 4,4'-bis(2,6-dimethyl-4-hydroxyphenyl)disulfide, Alkylidenebisphenols, such as 2,2'-methylenebis(6-tert-butyl-4-methylphenol), 2,2'-methylenebis(6-tert-butyl-4-ethylphenol), 2,2'-methylenebis[4-methyl-6-($\alpha$-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2-ethylidenebis(4,6-di-tert-butylphenol), 2,2'-ethylidenebis(6-tert-butyl-4-isobutylphenol), 2,2'-methylenebis[6-($\alpha$-methylbenzyl)-4-nonylphenol], 2,2'-methylenebis[6-($\alpha,\alpha$-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecyl-mercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecyl-mercaptobutane and 1,1,5,5-tetrakis(5-tert-butyl-4-hydroxy-2-methylphenyl) pentane, O-, N- and S-benzyl compounds, such as 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide and isooctyl-3,5-di-tert-butyl-4-hydroxybenzylmercaptoacetate, aromatic hydroxybenzyl compounds, such as 1,3,5-tris(3,5-di-tert-butyl-4-hydroxybenzyl)-2,4,6-trimethyl-benzene, 1,4-bis(3,5-di-tert-butyl-4-hydroxybenzyl)-2,3,5,6-tetramethyl-benzene and 2,4,6-tris(3,5-di-tert-butyl-4-hydroxybenzyl) phenol, Triazine compounds, such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris-(3,5-di-tert-butyl-4-hydroxyphenylpropionyl) hexahydro-1,3,5-triazine, 1,3,5-tris(3,5-dicyclohexyl-4-hydroxybenzyl)isocyanurate and 1,3,5-tris(2-hydroxyethyl) isocyanurate, Benzylphosphonates, such as dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4- hydroxybenzylphosphonate and dioctadecyl 5-tert-butyl-4-hydroxy-3-methylbenzylphosphonate, Acylaminophenols, such as 4-hydroxylauroylanilide, 4-hydroxystearoylanilide and octyl N-(3,5-di-tert-butyl-4-hydroxyphenyl)carbamate, Propionic and acetic esters, for example of monohydric or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane and 4-hydroxymethyl-1-phospha-2,6,7-trioxabicyclo[2.2.2]-octane, Propionamides based on amine derivatives, such as N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine and N,N'-bis(3,5-di-tert-butyl-4-hydroxyphenylpropionyl)hydrazine, Ascorbic acid (Vitamin C) and ascorbic acid derivatives, such as ascorbyl palmitate, laurate and stearate, and ascorbyl sulfate and phosphate, Antioxidants based on amine compounds, such as N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octyl-substituted diphenylamine, such as p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis[4-methoxyphenyl)amine, 2,6-di-tert-butyl-4-dimethylaminomethylphenol, 2,4-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octyl-substituted N-phenyl-1-naphthylamine, a mixture of mono- and dialkylated tert-butyl/tert-octyldiphenylamine, a mixture of mono- and dialkylated nonyldiphenylamine, a mixture of mono- and dialkylated dodecyldiphenylamine, a mixture of mono- and dialkylated isopropyl/isohexyldiphenylamine, a mixture of mono- and dialkylated tert-butyldiphenylamine, 2,3-dihydro-3,3-dimethyl-4H-1,4-benzothiazine, phenothiazine, a mixture of mono- and dialkylated tert-butyl/tert-octylphenothiazine, a mixture of mono- and dialkylated tert-octylphenothiazine, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl)sebacate, 2,2,6,6-tetramethylpiperidin-4-one and 2,2,6,6-tetramethylpiperidin-4-ol, Phosphines, Phosphites and phosphonites, such as triphenylphosnine triphenylphosphite, diphenyl alkyl phosphite, phenyl dialkyl phosphite, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl))pentaerythritol diphosphite, tristearyl sorbitol triphosphite, tetrakis(2,4-di-tert-butylphenyl)4,4'-biphenylenediphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]-1, 3,2-dioxaphosphocine, bis(2,4-di-tert-butyl-6-methylphenyl)methyl phosphite and bis(2,4-di-tert-butyl-6-methylphenyl)ethyl phosphite, 2-(2'-Hydroxyphenyl)benzotriazoles, such as 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3,5'-bis-(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxy phenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxy phenyl) benzotriazole, 2-(3'-dodecyl-2'-hydroxy-5'-methylphenyl) benzotriazole and 2-(3'-tert-butyl-2'-hydroxy-5'-(2-isooctyloxycarbonylethyl)phenyl benzotriazole, 2,2'-methylenebis[4-(1,1,3,3-tetramethylbutyl)-6-benzotriazol-2-ylphenol]; the product of complete esterification of 2-[3'-tert-butyl-5'-(2-methoxycarbonylethyl)-2'-hydroxyphenyl]-2H-benzotriazole with polyethylene glycol 300;

sulfur-containing peroxide scavengers and sulfur-containing antioxidants, such as esters of 3,3'-thiodipropionic acid, for example the lauryl, stearyl, myristyl and tridecyl esters, mercaptobenzimidazole and the zinc salt of 2-mercaptobenzimidazole, dibutylzinc dithiocarbamates, dioctadecyl disulfide and pentaerythritol tetrakis(β-dodecylmercapto)propionate, 2-hydroxybenzophenones, such as the 4-hydroxy, 4-methoxy, 4-octyloxy, 4-decycloxy, 4-dodecyloxy, 4-benzyloxy, 4,2',4'-trihydroxy and 2'-hydroxy-4,4'-dimethoxy derivatives, Esters of unsubstituted and substituted benzoic acids, such as 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl-3,5-di-tert-butyl-4-hydroxybenzoate, octadecyl-3,5-di-tert-butyl-4-hydroxybenzoate and 2-methyl-4,6-di-tert-butylphenyl-3,5-di-tert-butyl-4-hydroxybenzoate, Acrylates, such as ethyl α-cyano-β,β-diphenylacrylate, isooctyl α-cyano-β,β-diphenylacrylate, methyl α-methoxycarbonylcinnamate, methyl α-cyano-β-methyl-p-methoxycinnamate, butyl-α-cyano-β-methyl-p-methoxycinnamate and methyl-α-methoxycarbonyl-p-methoxycinnamate, sterically hindered amines, such as bis(2,2,6,6-tetramethylpiperidin-4-yl)sebacate, bis(2,2,6,6-tetramethylpiperidin-4-yl)

succinate, bis(1,2,2,6,6-pentamethylpiperidin-4-yl)sebacate, bis(1-octyloxy-2,2,6,6-tetramethylpiperidin-4-yl)sebacate, bis(1,2,2,6,6-pentamethylpiperidin-4-yl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, the condensation product of N,N'-bis(2,2,6,6-tetramethylpiperidin-4-yl)hexamethylenediamine and 4-tert-octylamino-2,6-dichloro-1,3,5-triazine, tris(2,2,6,6-tetramethylpiperidin-4-yl)nitrilotriacetate, tetrakis(2,2,6,6-tetramethylpiperidin-4-yl)1,2,3,4-butanetetracarboxylate, 1,1'-(1,2-ethylene)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidin-4-yl)2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidin-4-yl)sebacate, bis(1-octyloxy-2,2,6,6-tetramethylpiperidin-4-yl)succinate, the condensation product of N,N'-bis(2,2,6,6-tetramethylpiperidin-4-yl)hexamethylenediamine and 4-morpholino-2,6-dichloro-1,3,5-triazine, the condensation product of 2-chloro-4,6-bis(4-n-butylamino-2,2,6,6-tetramethylpiperidin-4-yl)-1,3,5-triazine and 1,2-bis(3-aminopropylamino)ethane, the condensation product of 2-chloro-4,6-di(4-n-butylamino-1,2,2,6,6-pentamethylpiperidin-4-yl)-1,3,5-triazine and 1,2-bis(3-aminopropylamino)ethane, 8-acetyl-3-dodecyl-7,7,9,9-tetramethyl-1,3,8-triazaspiro[4.5]-decane-2,4-dione, 3-dodecyl-1-(2,2,6,6-tetramethylpiperidin-4-yl)pyrrolidine-2,5-dione, 3-dodecyl-1-(1,2,2,6,6-pentamethylpiperidin-4-yl)pyrrolidine-2,5-dione, a mixture of 4-hexadecyloxy- and 4-stearyloxy-2,2,6,6-tetramethylpiperidine, the condensation product of N,N'-bis(2,2,6,6-tetramethylpiperidin-4-yl) hexamethylenediamine and 4-cyclohexylamino-2,6-dichloro-1,3,5-triazine, the condensation product of 1,2-bis(3-aminopropylamino)ethane and 2,4,6-trichloro-1,3,5-triazine, 4-butylamino-2,2,6,6-tetramethylpiperidine, N-(2,2,6,6-tetramethylpiperidin-4-yl)-n-dodecylsuccinimide, N-(1,2,2,6,6-pentamethylpiperidin-4-yl)-n-dodecylsuccinimide, 2-undecyl-7,7,9,9-tetramethyl-1-oxa-3,8-diaza-4-oxo-spiro[4.5]-decane, the condensation product of 7,7,9,9-tetramethyl-2-cycloundecyl-1-oxa-3,8-diaza-4-oxospiro-[4.5]decane and epichlorohydrin, the condensation products of 4-amino-2,2,6,6-tetramethylpiperidine with tetramethyloacetylenediureas and poly(methoxypropyl-3-oxy)-[4(2,2,6,6-tetramethyl)piperidinyl]-siloxane, Oxalamides, such as 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxalamide, 2-ethoxy-5-tert-butyl-2'-ethoxanilide and its mixture with 2-ethoxy-2'-ethyl-5,4'-di-tert-butoxanilide, and mixtures of ortho-, para-methoxy-disubstituted oxanilides and mixtures of ortho- and para-ethoxy-disubstituted oxanilides, and 2-(2-hydroxyphenyl)-1,3,5-triazines, such as 2,4,6-tris-(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropoxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine and 2-(2-hydroxyphenyl)-4-(4-methoxyphenyl)-6-phenyl-1,3,5-triazine.

In another preferred embodiment, the RM formulation comprises one or more solvents, which are preferably selected from organic solvents. The solvents are preferably selected from ketones such as acetone, methyl ethyl ketone, methyl propyl ketone, methyl isobutyl ketone or cyclohexanone; acetates such as methyl, ethyl or butyl acetate or methyl acetoacetate; alcohols such as methanol, ethanol or isopropyl alcohol; aromatic solvents such as toluene or xylene; alicyclic hydrocarbons such as cyclopentane or cyclohexane; halogenated hydrocarbons such as di- or trichloromethane; glycols or their esters such as PGMEA (propyl glycol monomethyl ether acetate), γ-butyrolactone. It is also possible to use binary, ternary or higher mixtures of the above solvents.

In case the RM formulation contains one or more solvents, the total concentration of all solids, including the RMs, in the solvent(s) is preferably from 10 to 60%.

Polymerisation of the RMs is preferably carried out in the presence of an initiator absorbing at the wavelength of the actinic radiation. For this purpose, preferably the RM formulation contains one or more polymerisation initiators.

For example, when polymerising by means of UV light, a photoinitiator can be used that decomposes under UV irradiation to produce free radicals or ions that start the polymerisation reaction. For polymerising acrylate or methacrylate groups preferably, a radical photoinitiator is used. For polymerising vinyl, epoxide or oxetane groups preferably a cationic photoinitiator is used. It is also possible to use a thermal polymerisation initiator that decomposes when heated to produce free radicals or ions that start the polymerisation. Typical radical photoinitiators are for example the commercially available Irgacure® or Darocure® (Ciba AG). for example Irgacure 127, Irgacure 184, Irgacure 369, Irgacure 651, Irgacure 817, Irgacure 907, Irgacure 1300, Irgacure, Irgacure 2022, Irgacure 2100, Irgacure 2959, or Darcure TPO. In another preferred embodiment, the RM formulation comprises a combination of one or more, more preferably of two or more of such photoinitiators.

A typical cationic photoinitiator is for example UVI 6974 (Union Carbide).

The concentration of the polymerisation initiator(s) as a whole in the RM formulation is preferably from 0.1 to 10%, very preferably from 0.5 to 8%, more preferably 2 to 6%.

Preferably, the polymerisable LC material comprises,
a) one or more mono-, di- or multireactive polymerisable mesogenic compounds,
b) one or more adhesion promoters selected from compounds of formula I,
c) one or more photoinitiators,
d) optionally one or more surfactants,
e) optionally one or more stabilizers,
f) optionally one or more mono-, di- or multireactive polymerisable non-mesogenic compounds,
g) optionally one or more dyes showing an absorption maximum at the wavelength used to initiate photo polymerisation,
h) optionally one or more chain transfer agents,
i) optionally one or more stabilizers.

More preferably, the polymerisable LC material comprises,
a) one or more monoreactive polymerisable mesogenic compounds, preferably in an amount of 10 to 95% by weight, very preferably 20 to 75%, preferably selected from the compounds of formulae II-1 and/or II-7,
b) one or more di- or multireactive polymerisable mesogenic compounds, preferably in an amount of 10 to 90% by weight, very preferably 20 to 75% by weight, preferably selected from the compounds of formula II-6 and/or II-7,
c) one or more adhesion promoters, preferably in an amount of 0.1 to 10% by weight, very preferably 0.5 to 5% by weight,
d) optionally one or more photoinitiators, preferably in an amount of 0.1 to 10% by weight, very preferably 0.5 to 8% by weight,
e) optionally one or more surfactants, and
f) optionally one or more stabilizers.

The invention further relates to a method of preparing a polymer film by
providing a layer of a polymerisable LC material as described above and below onto a substrate,
polymerising the polymerisable LC material, and
optionally removing the polymerised LC material from the substrate and/or optionally providing it onto another substrate.

It is also possible to dissolve the polymerisable LC material in a suitable solvent as described above. This solution is then coated or printed onto the substrate, for example by spin-coating, printing, or other known techniques, and the solvent is evaporated off before polymerisation. In most cases, it is suitable to heat the mixture in order to facilitate the evaporation of the solvent.

The polymerisable LC material can be applied onto a substrate by conventional coating techniques like spin coating, bar coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

Suitable plastic substrates are known to the expert and described in the literature, as for example conventional substrates used in the optical films industry. Especially suitable and preferred substrates for polymerisation are polyester such as polyethyleneterephthalate (PET) or polyethylenenaphthalate (PEN), polyvinylalcohol (PVA), polycarbonate (PC) triacetylcellulose (TAC), or cyclo olefin polymers (COP), or commonly known color filter materials, in particular triacetylcellulose (TAC), cyclo olefin polymers (COP), or commonly known color filter materials.

The polymer films are preferably prepared from the polymerisable LC material by in-situ polymerisation. In a preferred method of preparation the polymerisable LC material is coated onto a substrate and subsequently polymerised for example by exposure to heat or actinic radiation as described for example in WO 01/20394, GB 2,315,072 or WO 98/04651.

Polymerisation of the LC material is preferably achieved by exposing it to actinic radiation. Actinic radiation means irradiation with light, like UV light, IR light or visible light, irradiation with X-rays or gamma rays, or irradiation with high-energy particles, such as ions or electrons. Preferably, polymerisation is carried out by photo irradiation, in particular with UV light. As a source for actinic radiation, for example a single UV lamp or a set of UV lamps can be used. When using a high lamp power the curing time can be reduced. Another possible source for photo radiation is a laser, like e.g. a UV laser, an IR laser, or a visible laser.

The curing time is dependent, inter alia, on the reactivity of the polymerisable LC material, the thickness of the coated layer, the type of polymerisation initiator and the power of the UV lamp. The curing time is preferably ≤5 minutes, very preferably ≤3 minutes, most preferably ≤1 minute. For mass production, short curing times of ≤30 seconds are preferred.

A suitable UV radiation power is preferably in the range from 5 to 200 mWcm−2, more preferably in the range from 50 to 175 mWcm$^{-2}$ and most preferably in the range from 100 to 150 mWcm$^{-2}$.

In connection with the applied UV radiation and as a function of time, a suitable UV dose is preferably in the range from 25 to 7200 mJcm$^{-2}$ more preferably in the range from 500 to 7200 mJcm$^{-2}$ and most preferably in the range from 3000 to 7200 mJcm$^{-2}$.

Polymerisation is carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. UV photoinitiators are preferred, in particular radicalic UV photoinitiators.

Polymerisation is preferably performed under an inert gas atmosphere, preferably in a heated nitrogen atmosphere, but also polymerisation in air is possible.

Polymerisation is preferably performed at a temperature from 1 to 70° C., more preferably 5 to 50° C., even more preferably 15 to 30° C.

The polymerised LC film according to the present invention has good adhesion to plastic substrates, in particular to TAC, COP, and colour filters. Accordingly, it can be used as adhesive or base coating for subsequent LC layers which otherwise would not well adhere to the substrates.

The preferred thickness of a polymerised LC film according to the present invention is determined by the optical properties desired from the film or the final product. For example, if the polymerised LC film does not mainly act as an optical layer, but e.g. as adhesive, aligning or protection layer, its thickness is preferably not greater than 1 μm, in particular not greater than 0.5 μm, very preferably not greater than 0.2 μm.

For optical applications of the polymer film, it preferably has a thickness of from 0.5 to 10 μm, very preferably from 0.5 to 5 μm, in particular from 0.5 to 3 μm.

The optical retardation ($\delta(\lambda)$) of a polymer film as a function of the wavelength of the incident beam ($\lambda$) is given by the following equation (7):

$$\delta(\lambda)=(2\pi\Delta n \cdot d)/\lambda \tag{7}$$

wherein ($\Delta n$) is the birefringence of the film, (d) is the thickness of the film and $\lambda$ is the wavelength of the incident beam.

According to Snellius law, the birefringence as a function of the direction of the incident beam is defined as $$\Delta n = \sin \Theta / \sin \Psi \tag{8}$$

wherein $\sin \Theta$ is the incidence angle or the tilt angle of the optical axis in the film and $\sin \Psi$ is the corresponding reflection angle.

Based on these laws, the birefringence and accordingly optical retardation depends on the thickness of a film and the tilt angle of optical axis in the film (cf. Berek's compensator). Therefore, the skilled expert is aware that different optical retardations or different birefringence can be induced by adjusting the orientation of the liquid-crystalline molecules in the polymer film.

The birefringence (Δn) of the polymer film according to the present invention is preferably in the range from 0.01 to 0.30, more preferable in the range from 0.01 to 0.25 and even more preferable in the range from 0.01 to 0.16.

The optical retardation as a function of the thickness of the polymer film obtained by the method according to the present invention is less than 200 nm, preferable less than 180 nm and even more preferable less than 150 nm.

The homeotropic aligned polymer films of the present invention can be used as retardation or compensation film for example in LCDs to improve the contrast and brightness at large viewing angles and reduce the chromaticity. They can be used outside the switchable liquid-crystalline cell in an LCD, or between the substrates, usually glass substrates, forming the switchable liquid-crystalline cell and containing the switchable liquid-crystalline medium (in cell application).

Especially with regard to the in cell application, the polymer films according to the present invention exhibit a high temperature stability. Thus, the polymer films exhibit temperature stability up to 300° C., preferably up to 250° C., more preferably up to 230° C.

The polymer film of the present invention can also be used as alignment film for other liquid-crystalline or RM materials. For example, they can be used in an LCD to induce or improve alignment of the switchable liquid-crystalline medium, or to align a subsequent layer of polymerisable LC material coated thereon. In this way, stacks of polymerised LC films can be prepared.

In summary, the polymerised LC films and polymerisable LC materials according to the present invention are useful in optical elements like polarisers, compensators, alignment layer, circular polarisers or colour filters in liquid crystal displays or projection systems, decorative images, for the preparation of liquid crystal or effect pigments, and especially in reflective films with spatially varying reflection colours, e.g. as multicolour image for decorative, information storage or security uses, such as non-forgeable documents like identity or credit cards, banknotes etc.

The polymerised LC films according to the present invention can be used in displays of the transmissive or reflective type. They can be used in conventional OLED displays or LCDs, in particular LCDs of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) or PVA (patterned vertically aligned) displays, in displays of the bend mode or hybrid type displays, like e.g. OCB (optically compensated bend cell or optically compensated birefringence), R-OCB (reflective OCB), HAN (hybrid aligned nematic) or pi-cell (π-cell) displays, furthermore in displays of the TN (twisted nematic), HTN (highly twisted nematic) or STN (super twisted nematic) mode, in AMD-TN (active matrix driven TN) displays, or in displays of the IPS (in plane switching) mode which are also known as 'super TFT' displays. Especially preferred are VA, MVA, PVA, OCB, and pi-cell displays.

The polymerisable material and polymer films according to the present invention are especially useful for a 3D display as described in EP 0 829 744, EP 0 887 666 A2, EP 0 887 692, U.S. Pat. Nos. 6,046,849, 6,437,915 and in "Proceedings of the SID 20$^{th}$ International Display Research Conference, 2000", page 280. A 3D display of this type comprising a polymer film according to the invention is another object of the present invention.

The present invention is described above and below with particular reference to the preferred embodiments. It should be understood that various changes and modifications might be made therein without departing from the spirit and scope of the invention.

Many of the compounds or mixtures thereof mentioned above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here. Unless the context clearly indicates otherwise, as used herein plural forms of the terms herein are to be construed as including the singular form and vice versa.

Throughout this application, unless explicitly stated otherwise, all concentrations are given in weight percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November. 1997, Merck KGaA, Germany and are given for a temperature of 20° C., unless explicitly stated otherwise. The optical anisotropy (Δn) is determined at a wavelength of 589.3 nm.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

Throughout the description and claims of this specification, the words "obtainable" and "obtained" and variations of the words, mean "including but not limited to", and are not intended to (and do not) exclude other components. On the other hand, the word "obtainable" also encompasses the term "obtained" but is not limited to it.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The invention will now be described in more detail by reference to the following working examples, which are illustrative only and do not limit the scope of the invention.

The examples below serve to illustrate the invention without limiting it. In the foregoing and the following, all temperatures are given in degrees Celsius, and all percentages are by weight, unless stated otherwise.

EXAMPLES

Example 1

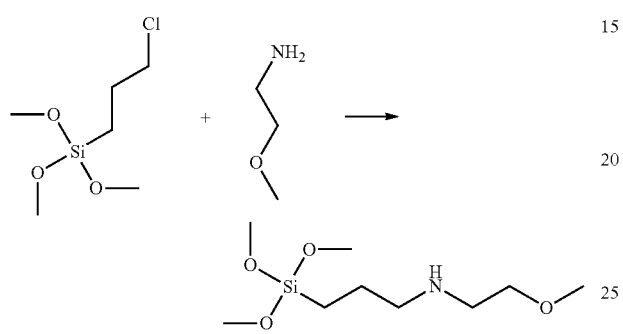

A mixture of 3-chloropropyl(trimethoxy)silane (4.64 ml; 0.03 mol; 1.00 eq.) and 2-Methoxy-ethylamine (10.94 ml; 0.13 mol; 5.00 eq.) is stirred under $N_2$-atmosphere, is heated to 90° C. and the reaction is allowed to proceed for 20 hours. The mixture is then allowed to cool and then distilled at 200 mbar and 100° C. to fully remove unreacted amine. The resulting orange residue is dissolved in toluene (350 ml) which is subsequently shaken with 8.5 M sodium hydroxide solution (200.00 ml) for 30 seconds. The aqueous layer is removed and the combined organics is washed once with water. The organic layer is then collected and reduced in vacuo to yield an orange liquid (2.86 g). This orange liquid is then distilled at 1 mbar and 150° C. to give the product as a colourless liquid (1.15 g).

Example 2

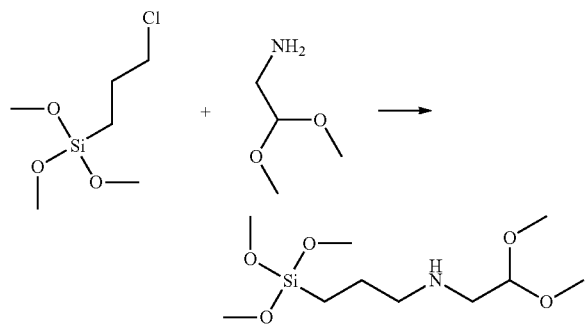

A mixture of 3-chloropropyl(trimethoxy)silane (4.64 ml; 25.16 mmol; 1.00 eq.) and aminoacetaldehyde dimethyl acetal (13.71 ml; 125.81 mmol; 5.00 eq.) is stirred under $N_2$-atmosphere, is heated to 90° C. and the reaction is allowed to proceed for 20 hours. The mixture is cooled and then distilled at 10 mbar and 75° C. to remove any unreacted amine. The resulting orange residue is dissolved in toluene (350 ml) which is subsequently shaken with 8.5 M sodium hydroxide solution (200.00 ml) for 30 seconds. The organic layer is then collected and reduced in vacuo to yield a yellow liquid (7.79 g). This yellow liquid is then distilled at $7 \times 10^{-2}$ mbar and 145° C. to give the product as a colourless liquid (4.20 g).

Example 3 to 9

In the same manner as described above, the following compounds can be obtained:

| Example | Structure |
|---|---|
| 3 | |
| 4 | |
| 5 | |
| 6 | |
| 7 | |
| 8 | |
| 9 | |

Mixture Examples

The polymerisable LC mixture M1 is formulated as follows:
(1) 22.03%
(2) 19.58%
(3) 34.29%
(4) 22.03%
Irgacure 651 1.00%
Irganox 1076 0.08%

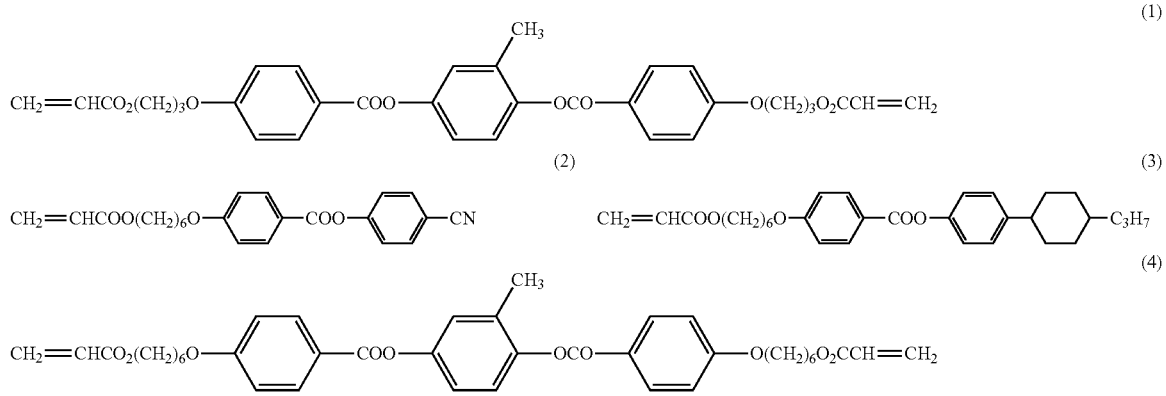

Irgacure651® is a photoinitiator, Irganox1076® a stabilizer, both being commercially available (Ciba AG, Basel, Switzerland).

Alignment and Adhesion on a COP Substrate

The adhesion promotor to be tested is added in 1% by weight to M1 and dissolved to 20% solids in 2:1 MEK/Cyclopentanone. The resulting solution is bar coated (Mayer Bar 5) onto the corresponding corona treated COP substrate, annealed at room temperature and photopolymerised (20 mWcm$^{-2}$, 60 s, N$_2$). The quality of the alignment is checked by eye through crossed polarisers as well as via polarized optical microscopy.

The adhesion of the film to the substrate is tested using the Nichiban 305 tape test. The film is scored in a cross-hatched pattern of 100 squares. The 305 tape is thereby applied over the polymer film in the cross-hatched region and removed sharply. The adhesion is deemed to pass if the film was not removed.

Yellowing

In order to test the yellowing effect the adhesion promotor to be tested is dissolved in cyclopentanone and methylethylketone (MEK) (2:1) and kept in dark conditions at room temperature for 75 h. The solution is then measured via UV-Vis spectroscopy to quantify the degree of yellowing of the solution.

The results of each of the above described tests are summarized in the following table.

| Example | Alignment | Initial Adhesion JX COP | Initial Adhesion ZEON COP | Adhesion after 1 d ZEON COP | Adhesion after 2 d ZEON COP | Rank | Yellowing 425 nm % T | Rank |
|---|---|---|---|---|---|---|---|---|
| Tego ADDID 900 | ○ | ○ | ○ | ○ | ○ | 1 | 2.1 | 7 |
| 1 | ○ | X | X | ○ | ○ | 2 | 90.3 | 4 |
| 2 | ○ | X | X | ○ | ○ | 4 | 96.9 | 1 |
| 3 | ○ | X | X | ○ | ○ | 6 | 86.2 | 6 |
| 4 | ○ | X | X | ○ | ○ | 3 | 96.9 | 1 |
| 5 | ○ | X | X | X | ○ | 7 | 88.9 | 5 |
| 6 | ○ | X | X | ○ | ○ | 5 | 95.6 | 3 |

○ denotes pass,
X denotes fail.

Tego Addid® 900 rather shows the best initial adhesion on both JX COP and Zeon COP, however, Tego Addid® 900 suffers from a strong yellowing over time. In contrast to that, all polymer films comprising compounds in accordance with the present invention show with respect to Tego Addid® 900 a comparable adhesion on Zeon COP at latest after 2 days, however, the unfavorable yellowing over time is significantly reduced.

The invention claimed is:

1. A polymerizable liquid crystal material comprising one or more polymerizable mesogenic compounds and at least one compound of formula I, $$(R^{11}O)_sSi(CH_3)_{3-s}\text{-Sp}^{11}\text{-NR}^{12}\text{-Sp}^{12}\text{-C(OR}^{13})_tH_{3-t} \qquad I$$

wherein $R^{11}$ is, in each case independently, methyl or ethyl;

$R^{12}$ is H or straight-chain alkylene having 1 to 12 C atoms or branched alkylene having 3 to 12 C atoms, in which one or more non-adjacent CH$_2$ groups may each be replaced, independently of one another by —CH=CH—, —C≡C—, —O—, —S—, —CO—, —CO—O—, —O—CO—, or —O—CO— in such a way that O and/or S atoms are not linked directly to one another, and in which, in addition, one or more H atoms may each be replaced by F, Cl or CN;

$R^{13}$ is, in each case independently, methyl or ethyl;

Sp$^{11}$ is a single bond or straight-chain alkylene having 1 to 12 C atoms or branched alkylene having 3 to 12 C atoms, in which one or more non-adjacent CH$_2$ groups may each be replaced, independently of one another, by —CH=CH—, —C≡C—, —O—, —S—, —CO—, —CO—O—, —O—CO—, or —O—CO— in such a way that O and/or S atoms are not linked directly to one another, and in which, in addition, one or more H atoms may each be replaced by F, Cl or CN;

$Sp^{12}$ is a single bond or straight-chain alkylene having 1 to 12 C atoms or branched alkylene having 3 to 12 C atoms, in which one or more non-adjacent $CH_2$ groups may each be replaced, independently from one another, by —CH=CH—, —C≡C—, —O—, —S—, —CO—, —CO—O—, —O—CO—, or —O—CO—O— in such a way that O and/or S atoms are not linked directly to one another, and in which, in addition, one or more H atoms may each be replaced by F, Cl or CN;

s is an integer from 0 to 3; and t is 1.

2. The polymerizable liquid crystal material according to claim 1, wherein said compound is a compound of formula I-A

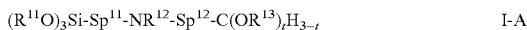
$$(R^{11}O)_3Si\text{-}Sp^{11}\text{-}NR^{12}\text{-}Sp^{12}\text{-}C(OR^{13})_tH_{3-t} \qquad \text{I-A}$$

wherein $R^{11}$ to $R^{13}$, $Sp^{11}$, $Sp^{12}$ and t have the meanings given in claim 1.

3. The polymerizable liquid crystal material according to claim 1, in which $R^{11}$ is methyl.

4. The polymerizable liquid crystal material according to claim 1, in which $R^{13}$ is methyl.

5. The polymerizable liquid crystal material according to claim 1, in which $Sp^{12}$ is methylene or ethylene.

6. The polymerizable liquid crystal material according to claim 1, in which $Sp^{11}$ denotes a methylene, ethylene, propylene, or butylene.

7. The polymerizable liquid crystal material according to claim 1, in which the polymerizable mesogenic compounds are selected from one or more monoreactive polymerizable mesogenic compounds.

8. A polymer film obtainable from a polymerizable liquid crystal material according to claim 1, by a process comprising:
providing a layer of the polymerizable liquid crystal material onto a substrate,
polymerizing the polymerizable liquid crystal material, and
optionally, removing the polymerized liquid crystal material from the substrate and/or optionally providing the polymerized liquid crystal material onto another substrate.

9. The polymer film according to claim 8, wherein the polymerized liquid crystal material is homeotropically aligned.

10. A method of increasing the adhesion of a polymer film, obtained from a polymerizable liquid crystal material, to a substrate, film or surface, by adding at least one compound of the following formula I to the polymerizable liquid crystal material before polymerization,

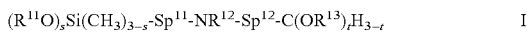
$$(R^{11}O)_sSi(CH_3)_{3-s}\text{-}Sp^{11}\text{-}NR^{12}\text{-}Sp^{12}\text{-}C(OR^{13})_tH_{3-t} \qquad \text{I}$$

wherein $R^{11}$ is, in each case independently, methyl or ethyl;

$R^{12}$ is H or straight-chain alkylene having 1 to 12 C atoms or branched alkylene having 3 to 12 C atoms, in which one or more non-adjacent $CH_2$ groups may each be replaced, independently of one another by —CH=CH—, —C≡C—, —O—, —S—, —CO—, —CO—O—, —O—CO—, or —O—CO— in such a way that O and/or S atoms are not linked directly to one another, and in which, in addition, one or more H atoms may each be replaced by F, Cl or CN;

$R^{13}$ is, in each case independently, methyl or ethyl;

$Sp^{11}$ is a single bond or straight-chain alkylene having 1 to 12 C atoms or branched alkylene having 3 to 12 C atoms, in which one or more non-adjacent $CH_2$ groups may each be replaced, independently of one another, by —CH=CH—, —C≡C—, —O—, —S—, —CO—, —CO—O—, —O—CO—, or —O—CO—O— in such a way that O and/or S atoms are not linked directly to one another, and in which, in addition, one or more H atoms may each be replaced by F, Cl or CN;

$Sp^{12}$ is a single bond or straight-chain alkylene having 1 to 12 C atoms or branched alkylene having 3 to 12 C atoms, in which one or more non-adjacent $CH_2$ groups may each be replaced, independently from one another, by —CH=CH—, —C≡C—, —O—, —S—, —CO—, —CO—O—, —O—CO—, or —O—CO—O— in such a way that O and/or S atoms are not linked directly to one another, and in which, in addition, one or more H atoms may each be replaced by F, Cl or CN;

s is an integer from 0 to 3; and t is 1.

11. The method according to claim 10, wherein the substrate is selected from TAC and COP substrates or is a color filter.

12. A liquid crystal display, 3D display, projection system, polarizer, compensator, alignment layer, circular polarizer, color filter, decorative image, liquid crystal pigments, reflective film with spatially varying reflection color, multicolor image, or non-forgeable documents comprising a polymerized material obtained by polymerizing the polymerizable liquid crystal material according to claim 1.

13. An optical component or device, polarizer, patterned retarder, compensator, alignment layer, circular polarizer, color filter, decorative image, liquid crystal lens, liquid crystal pigment, reflective film with spatially varying reflection color, multicolor image for decorative or information storage, comprising a polymerizable liquid crystal material according to claim 1.

14. The polymerizable liquid crystal material according to claim 1, wherein
$Sp^{12}$ is methylene or ethylene,
$Sp^{11}$ denotes a methylene, ethylene, propylene, or butylene spacer, and
$R^{12}$ denotes H or an alkylene or alkoxy radical.

15. The polymerizable liquid crystal material according to claim 1, wherein
$R^{11}$ denotes in each case a methyl radical,
$R^{13}$ denotes in each case a methyl radical,
$Sp^{12}$ is ethylene,
$Sp^{11}$ denotes straight n-propylene or branched sec-butylene, and
$R^{12}$ denotes H.

16. The polymerizable liquid crystal material according to claim 1, wherein said compound is selected from the following compounds:

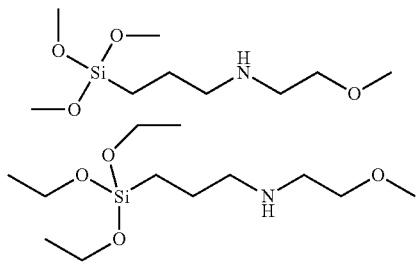

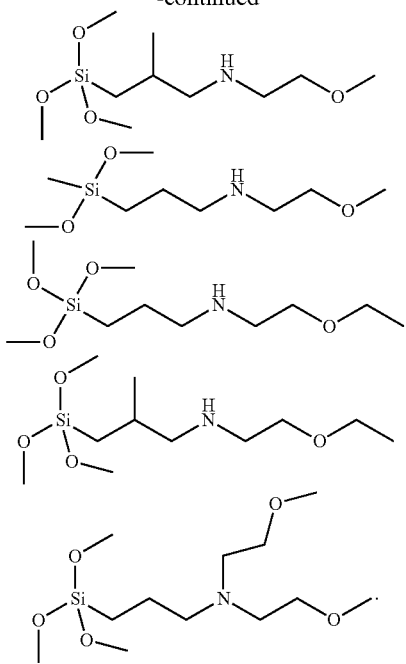

17. The polymerizable liquid crystal material according to claim 1, wherein the polymerizable mesogenic compounds are selected from compounds of formula II:

P-Sp-MG-R⁰     II wherein
P is a polymerizable group,
Sp is a spacer group or a single bond,
MG is a rod-shaped mesogenic group,
$R^0$ is H, alkyl, alkoxy or thioalkyl with 1 to 20 C atoms or alkylcarbonyl, alkoxycarbonyl, alkylcarbonyloxy or alkoxycarbonyloxy with 2 to 20 C atoms more, which are optionally fluorinated, or is $Y^0$ or P-Sp-, and
$Y^0$ is F, Cl, CN, NO₂, OCH₃, OCN, SCN, optionally fluorinated alkylcarbonyl, alkoxycarbonyl, alkylcarbonyloxy or alkoxycarbonyloxy with 2 to 4 C atoms, or mono- oligo- or polyfluorinated alkyl or alkoxy with 1 to 4 C atoms.

18. The polymerizable liquid crystal material according to claim 17, wherein
P is an acryl, methacryl, vinyl, vinyloxy, propenyl ether, epoxy, oxetane or styrene group,
MG is a rod-shaped mesogenic group of formula M,
M is $-(A^{21}-Z^{21})_k-A^{22}-(Z^{22}-A^{23})_r-$,
$A^{21}$ to $A^{23}$ are in each occurrence independently of one another an aryl-, heteroaryl-, heterocyclic- or alicyclic group optionally substituted by one or more identical or different groups L,
$Z^{21}$ and $Z^{22}$ are in each occurrence independently from each other, —O—, —S—, —CO—, —COO—, —OCO—, —S—CO—, —CO—S—, —O—COO—, —CO—NR⁰¹—, —NR⁰¹—CO—, —NR⁰¹—CO—NR⁰², —NR⁰¹—CO—O—, —O—CO—NR⁰¹—, —OCH₂—, —CH₂O—, —SCH₂—, —CH₂S—, —CF₂O—, —OCF₂—, —CF₂S—, —SCF₂—, —CH₂CH₂—, —(CH₂)₄—, —CF₂CH₂—, —CH₂CF₂—, —CF₂CF₂—, —CH=N—, —N=CH—, —N=N—, —CH=CR¹—, —CY⁰¹=CY⁰²—, —C≡C—, —CH=CH—COO—, —OCO—CH=CH—, or a single bond,
L is F, Cl, Br, I, —CN, —NO₂, —NCO, —NCS, —OCN, —SCN, —C(=O)NR$^{xx}$R$^{yy}$, —C(=O)OR$^{xx}$, —C(=O)R$^{xx}$, —NR$^{xx}$R$^{yy}$, —OH, —SF₅, or straight chain alkyl or alkoxy with 1 to 20 C atoms, branched alkyl or alkoxy with 3 to 20 C atoms or alkylcarbonyl, alkoxycarbonyl, alkylcarbonyloxy or alkoxycarbonyloxy with 2 to 20 C atoms, wherein one or more H atoms are each optionally replaced by F or Cl,
R$^{xx}$ and R$^{yy}$ independently of each other denote H or alkyl with 1 to 12 C-atoms,
$R^0$ is H, alkyl, alkoxy or thioalkyl with 1 to 20 C atoms or alkylcarbonyl, alkoxycarbonyl, alkylcarbonyloxy or alkoxycarbonyloxy with 2 to 20 C atoms, which are optionally fluorinated, or is $Y^0$ or P-Sp-,
$Y^0$ is F, Cl, CN, NO₂, OCH₃, or mono- oligo- or polyfluorinated alkyl or alkoxy with 1 to 4 C atoms,
$R^{01}$ and $R^{02}$ each, independently of one another, denote H or alkyl having 1 to 12 C atoms,
$Y^{01}$ and $Y^{02}$ each, independently of one another, denote H, F, Cl or CN, and
k and l are each and independently 0, 1, 2, 3 or 4.

19. The polymerizable liquid crystal material according to claim 1, wherein said compound of formula I is a compound of formula I-B $(R^{11}O)_2(CH_3)Si-Sp^{11}-NR^{12}-Sp^{12}-C(OR^{13})_tH_{3-t}$     I-B wherein $R^{11}$ to $R^{13}$, $Sp^{11}$, $Sp^{12}$ and t have the meanings given in claim 1.

20. The polymerizable liquid crystal material according to claim 1, wherein said compound of formula I is a compound of formula I-C $(R^{11}O)(CH_3)_2Si-Sp^{11}-NR^{12}-Sp^{12}-C(OR^{13})_tH_{3-t}$     I-C wherein $R^{11}$ to $R^{13}$, $Sp^{11}$, $Sp^{12}$ and t have the meanings given in claim 1.

21. The polymerizable liquid crystal material according to claim 1, wherein said compound of formula I is a compound of formula I-D $(CH_3)_3Si-Sp^{11}-NR^{12}-Sp^{12}-C(OR^{13})_tH_{3-t}$     I-D wherein $R^{12}$ to $R^{13}$, $Sp^{11}$, $Sp^{12}$ and t have the meanings given in claim 1.

22. The polymerizable liquid crystal material according to claim 1, in which the polymerizable mesogenic compounds are selected from one or more di- and/or multireactive polymerizable mesogenic compounds.

* * * * *